(12) United States Patent
Krah et al.

(10) Patent No.: US 8,988,390 B1
(45) Date of Patent: Mar. 24, 2015

(54) FREQUENCY AGILE TOUCH PROCESSING

(71) Applicant: Apple Inc., Cupertino, CA (US)

(72) Inventors: Christoph H. Krah, Los Altos, CA (US); Marduke Yousefpor, San Jose, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 13/935,333

(22) Filed: Jul. 3, 2013

(51) Int. Cl.
G06F 3/041 (2006.01)

(52) U.S. Cl.
CPC .................................. G06F 3/041 (2013.01)
USPC ........................................................ 345/174

(58) Field of Classification Search
None
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,526,294 A | 6/1996 | Ono et al. | |
| 5,650,801 A | 7/1997 | Higashi | |
| 5,766,463 A | 6/1998 | Janik et al. | |
| 5,816,225 A | 10/1998 | Koch et al. | |
| 5,825,352 A | 10/1998 | Bisset et al. | |
| 5,835,079 A | 11/1998 | Shieh | |
| 5,880,411 A | 3/1999 | Gillespie et al. | |
| 5,920,309 A | 7/1999 | Bisset et al. | |
| 6,075,520 A | 6/2000 | Inoue et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,327,011 B2 | 12/2001 | Kim | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,237,667 B2 | 8/2012 | Krah | |
| 8,479,122 B2 | 7/2013 | Hotelling et al. | |
| 8,592,697 B2 | 11/2013 | Hotelling et al. | |
| 8,593,423 B2 | 11/2013 | Hotelling et al. | |
| 8,791,920 B2 | 7/2014 | Krah | |
| 2003/0132922 A1 | 7/2003 | Philipp | |
| 2004/0183833 A1 | 9/2004 | Chua | |
| 2006/0026521 A1 | 2/2006 | Hotelling et al. | |
| 2006/0114650 A1 | 6/2006 | Wang et al. | |
| 2006/0132462 A1 | 6/2006 | Geaghan | |
| 2006/0197753 A1 | 9/2006 | Hotelling | |
| 2007/0109274 A1 | 5/2007 | Reynolds | |

(Continued)

FOREIGN PATENT DOCUMENTS

| | | |
|---|---|---|
| JP | 2000-163031 A | 6/2000 |
| JP | 2002-342033 A | 11/2002 |

(Continued)

OTHER PUBLICATIONS

Final Office Action mailed Aug. 17, 2012, for U.S. Appl. No. 13/250,984, filed Sep. 30, 2011, 14 pages.

(Continued)

Primary Examiner — Joseph Haley
(74) Attorney, Agent, or Firm — Morrison & Foerster LLP

(57) ABSTRACT

A touch input device configured to maintain system performance despite a changing master clock frequency is provided. The touch input device includes one or more agile clocking dynamic scaling engines that can detect changes in the frequency of the master clock and can scale parameters of the touch controller associated with touch detection such that time domain to maintain uniform system performance.

25 Claims, 13 Drawing Sheets

(56) References Cited

U.S. PATENT DOCUMENTS

| | | |
|---|---|---|
| 2007/0273663 A1 | 11/2007 | Park et al. |
| 2008/0157867 A1 | 7/2008 | Krah |
| 2008/0158172 A1 | 7/2008 | Hotelling et al. |
| 2008/0309625 A1 | 12/2008 | Krah et al. |
| 2008/0309628 A1 | 12/2008 | Krah et al. |
| 2009/0009483 A1 | 1/2009 | Hotelling et al. |
| 2010/0059295 A1 | 3/2010 | Hotelling |
| 2010/0060589 A1 | 3/2010 | Wilson |
| 2010/0060593 A1 | 3/2010 | Krah |
| 2012/0019467 A1 | 1/2012 | Hotelling |
| 2012/0299880 A1 | 11/2012 | Krah |
| 2014/0022203 A1* | 1/2014 | Karpin et al. ............ 345/174 |
| 2014/0043293 A1 | 2/2014 | Hotelling |
| 2014/0306913 A1 | 10/2014 | Krah |

FOREIGN PATENT DOCUMENTS

| | | |
|---|---|---|
| WO | WO-2008/085719 A2 | 7/2008 |
| WO | WO-2010/030706 A1 | 3/2010 |
| WO | WO-2010/030709 A1 | 3/2010 |

OTHER PUBLICATIONS

Final Office Action mailed Aug. 28, 2012, for U.S. Appl. No. 12/283,423, filed Sep. 10, 2008, 14 pages.
International Search Report mailed Dec. 21, 2009, for PCT Application No. PCT/US2009/056413, filed Sep. 9, 2009, three pages.
International Search Report mailed Dec. 22, 2009, for PCT Application No. PCT/US2009/056410, filed Sep. 9, 2009, three pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action mailed May 20, 2011, for U.S. Appl. No. 12/283,435, filed Sep. 10, 2008, six pages.
Non-Final Office Action mailed Nov. 7, 2011, for U.S. Appl. No. 13/250,984, filed Sep. 30, 2011, nine pages.
Non-Final Office Action mailed Nov. 17, 2011, for U.S. Appl. No. 12/283,423, filed Sep. 10, 2008, nine pages.
Non-Final Office Action mailed Nov. 25, 2011, for U.S. Appl. No. 12/208,329, filed Sep. 10, 2008, 31 pages.
Non-Final Office Action mailed Apr. 13, 2012, for U.S. Appl. No. 13/250,984, filed Sep. 30, 2011, 14 pages.
Non-Final Office Action mailed Sep. 28, 2012, for U.S. Appl. No. 12/208,329, filed Sep. 10, 2008, 33 pages.
Non-Final Office Action mailed Oct. 5, 2012, for U.S. Appl. No. 13/568,027, filed Aug. 6, 2012, six pages.
Non-Final Office Action mailed Dec. 7, 2012, for U.S. Appl. No. 13/250,984, filed Sep. 30, 2011, 10 pages.
Non-Final Office Action mailed Apr. 23, 2013, for U.S. Appl. No. 13/568,027, filed Aug. 6, 2012, 8 pages.
Notice of Allowance mailed Apr. 5, 2012, for U.S. Appl. No. 12/283,435, filed Sep. 10, 2008, seven pages.
Notice of Allowance mailed Mar. 21, 2013, U.S. Appl. No. 12/208,329, filed Sep. 10, 2008, 14 pages.
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Non-Final Office Action mailed May 13, 2014, for U.S. Appl. No. 14/056,841, filed Oct. 17, 2013, seven pages.
Non-Final Office Action mailed Sep. 29, 2014, for U.S. Appl. No. 14/315,162, filed Jun. 25, 2014, seven pages.
Fakatselis, J. (Aug. 1996). "Processing Gain for Direct Sequence Spread Spectrum Communication Systems and PRISM®," Application Note AN9633, *Intersil*, four pages.
Non-Final Office Action mailed Jun. 6, 2014, for U.S. Appl. No. 12/208,329, filed Sep. 10, 2008, 12 pages.
Final Office Action mailed Dec. 30, 2013, for U.S. Appl. No. 12/208,329, filed Sep. 10, 2008, 12 pages.
Non-Final Office Action mailed Aug. 29, 2013, for U.S. Appl. No. 12/208,329, filed Sep. 10, 2008, 13 pages.
Notice of Allowance mailed May 23, 2013, for U.S. Appl. No. 13/250,984, filed Sep. 30, 2011, 10 pages.
Notice of Allowance mailed Aug. 23, 2013, for U.S. Appl. No. 13/250,984, filed Sep. 30, 2011, 10 pages.
Notice of Allowance mailed Aug. 29, 2013, for U.S. Appl. No. 12/283,423, filed Sep. 10, 2008, eight pages.
Notice of Allowance mailed Nov. 25, 2013, for U.S. Appl. No. 13/568,027, filed Aug. 6, 2012, nine pages.
Notice of Allowance mailed Mar. 11, 2014, for U.S. Appl. No. 13/568,027, filed Aug. 6, 2012, eight pages.

* cited by examiner

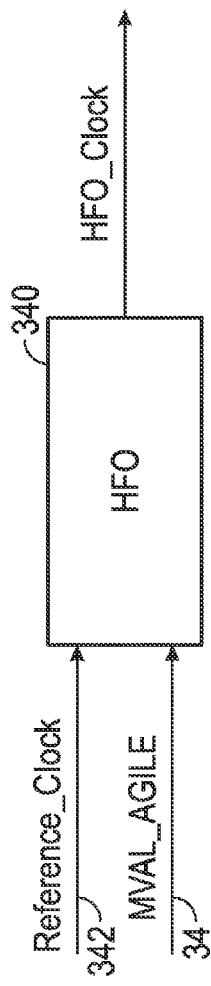
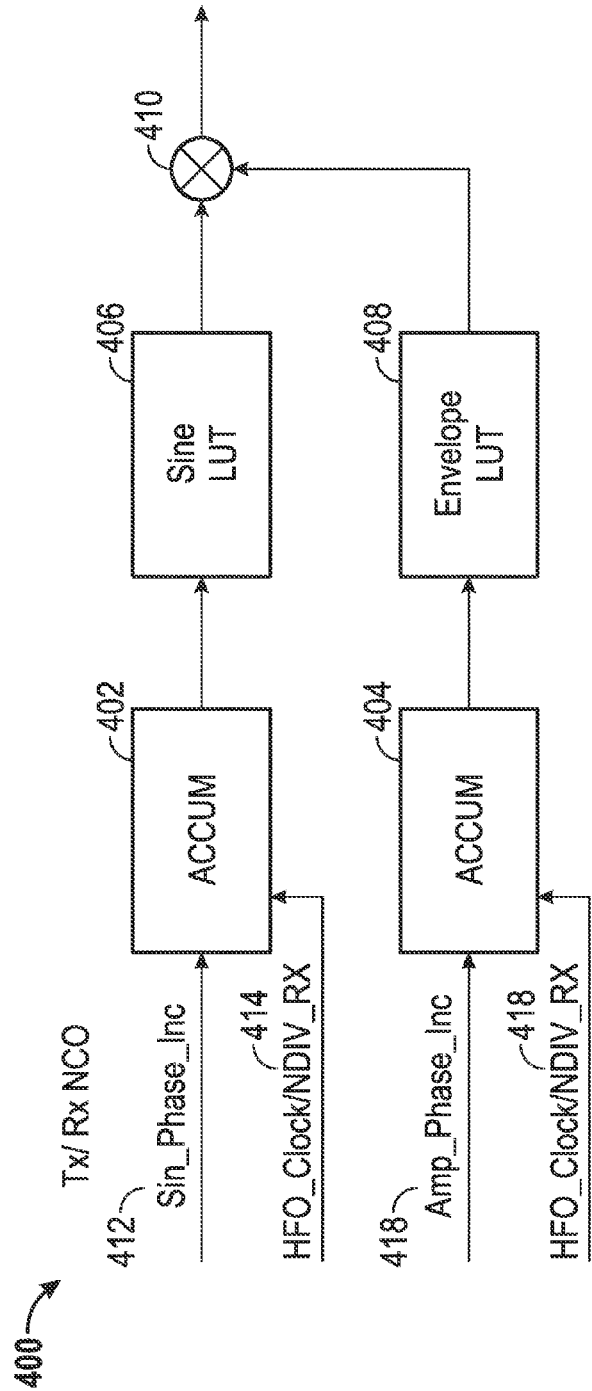
FIG. 3B
FIG. 4

FREQUENCY AGILE TOUCH PROCESSING

FIELD

This relates generally to controllers for multi-stimulus sensors, and in particular, to configuring a multi-stimulus controller to allow for a frequency agile master clock.

BACKGROUND

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include an integrated touch sensor and display panel, which can be a clear panel with a touch-sensitive surface, and a display device such as a liquid crystal display (LCD) that can use common circuit components to perform touch detection and display operations. The display operation and touch operations can be time multiplexed in order to allow the common circuit components to be used as touch hardware during a touch operation and as display hardware during a display operation. The synchronization and timing between the display and touch operations can be coordinated using a touch/display controller that has a master clock to coordinate the various operations. This master clock however, can cause electrical interference with various electronics of the device.

SUMMARY

In view of the foregoing, a multi-stimulus controller for a multi-touch sensor is formed on a single integrated circuit (single-chip) to include a frequency agile master clock/oscillator. The controller can also include an agile clocking dynamic scaling engine that can convert changes in the master clock frequency, to changes in the sample domain in order to keep time dependent parameters such as integration time, frequency and delay constant for various components of the controller such as the touch transmitter, touch receiver and the touch demodulator, thus ensuring uniform performance of the touch sensor panel over varying master clock frequencies.

BRIEF DESCRIPTION OF THE DRAWINGS

FIG. 3b illustrates an example master clock that can be employed by a touch controller according to examples of the disclosure.

FIG. 4 illustrates an exemplary numerically controlled oscillator according to examples of the disclosure.

DETAILED DESCRIPTION OF THE PREFERRED EXAMPLES

In the following description of preferred examples, reference is made to the accompanying drawings which form a part hereof, and in which it is shown by way of illustration specific examples that can be practiced. It is to be understood that other examples can be used and structural changes can be made without departing from the scope of the examples of this disclosure.

This relates to maintaining uniform touch detection performance in light of a frequency agile master clock of the controller that can change its clocking frequency upon request from the device to accommodate the frequency spectrum needs of proximal components with which the master clock can interfere. In one example, when the master clock changes its frequency upon request from the device, components of the controller that depend on the master clock to set various parameters such as integration time, transmit frequency, demodulation frequency, or programmed delay can also change. This, in turn, can cause the performance of the touch sensor panel to vary depending on the master clock frequency. In order to ensure a more uniform performance of the touch sensor panel when the master clock frequency changes, a scaling engine can convert the change in frequency to a change in the number of samples accumulated by various components of the touch controller, such that performance of the device can be substantially unaffected by changes in the master clock frequency.

Although examples of the disclosure may be described and illustrated herein in terms of mutual capacitance touch sensor panels, it should be understood that examples of this disclosure are not so limited, but are additionally applicable to self-capacitance sensor panels, and both single and multi-touch sensor panels. Furthermore, although examples of the disclosure may be described and illustrated herein in terms of double-sided ITO (DITO) touch sensor panels, it should be understood that examples of the disclosure are also applicable to other touch sensor panel configurations, such as configurations in which the drive and sense lines are formed on different substrates or on the back of a cover glass, and configurations in which the drive and sense lines are formed on the same side of a single substrate.

Figure 1:
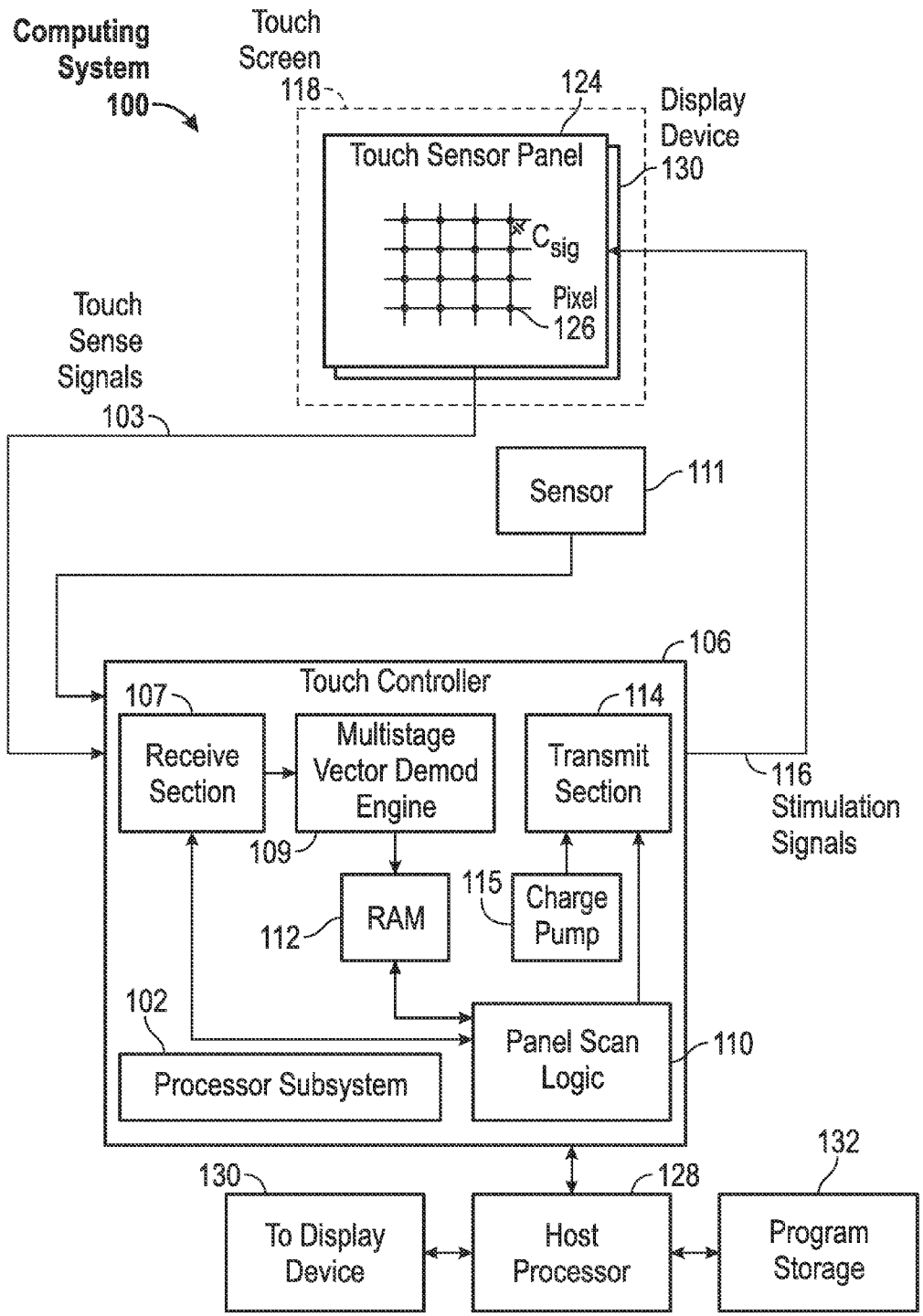
FIG. 1 illustrates an example computing system according to examples of the disclosure.

FIG. 1 illustrates an example computing system 100 that utilizes a single-ASIC multi-touch controller 106 with integrated drive system according to examples of the invention. Touch controller 106 is a single application specific integrated circuit (ASIC) that can include one or more processor subsystems 102, which can include, for example, one or more main processors, such as ARM968 processors or other processors with similar functionality and capabilities. However, in other examples, the processor functionality can be implemented instead by dedicated logic, such as a state machine. Processor subsystems 102 can also include, for example, peripherals (not shown) such as random access memory (RAM) or other types of memory or storage, watchdog timers and the like. Touch controller 106 can also include, for example, a receive section 107 for receiving signals, such as touch sense signals 103 of one or more sense channels (not shown), other signals from other sensors such as sensor 111, etc. Touch controller 106 can also include, for example, a demodulation section such as multistage vector demod engine 109, panel scan logic 110, and a drive system including, for example, a transmit section 114. Panel scan logic 110 can access RAM 112, autonomously read data from the sense channels and provide control for the sense channels. In addition, panel scan logic 110 can control transmit section 114 to generate stimulation signals 116 at various frequencies and phases that can be selectively applied to rows of a touch sensor panel 124.

A charge pump 115 can be used to generate the supply voltage for the transmit section. The stimulation signals 116 (Vstim) can have amplitudes higher than the maximum voltage the ASIC process can tolerate by cascoding transistors. Therefore, the stimulus voltage can be higher (e.g. 6V) than the voltage level that a single transistor can handle (e.g. 3.6 V). Although FIG. 1 shows charge pump 115 separate from transmit section 114, the charge pump can be part of the transmit section.

Touch sensor panel 124 can include a capacitive sensing medium having a plurality of row traces (e.g., drive lines) and a plurality of column traces (e.g., sense lines), although other sensing media can also be used. The row and column traces can be formed from a transparent conductive medium such as Indium Tin Oxide (ITO) or Antimony Tin Oxide (ATO), although other transparent and non-transparent materials such as copper can also be used. In some examples, the row and column traces can be perpendicular to each other, although in other examples other non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting or adjacent traces of other geometric configurations having first and second dimensions (e.g. the concentric and radial lines of a polar-coordinate arrangement). The rows and columns can be formed on, for example, a single side of a substantially transparent substrate separated by a substantially transparent dielectric material, a single side of a substrate and on the same layer, on opposite sides of the substrate, on two separate substrates separated by the dielectric material, etc.

At the "intersections" of the traces, where the traces pass above and below (cross) each other (but do not make direct electrical contact with each other) or are adjacent to each other, the traces can essentially form two electrodes (although more than two traces could intersect as well). Each intersection of row and column traces can represent a capacitive sensing node and can be viewed as picture element (pixel) 126, which can be particularly useful when touch sensor panel 124 is viewed as capturing an "image" of touch. (In other words, after touch controller 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes can appear as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Computing system 100 can also include host processor 128 for receiving outputs from processor subsystems 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device. In some examples, host processor 128 can be a separate component from touch controller 106, as shown. In other examples, host processor 128 can be included as part of touch controller 106. In still other examples, the functions of host processor 128 can be performed by processor subsystem 102 and/or distributed among other components of touch controller 106. Display device 130 together with touch sensor panel 124, when located partially or entirely under the touch sensor panel, can form touch screen 118.

Note that one or more of the functions described above can be performed, for example, by firmware stored in memory (e.g., one of the peripherals) and executed by processor subsystem 102, or stored in program storage 132 and executed by host processor 128. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 2A:
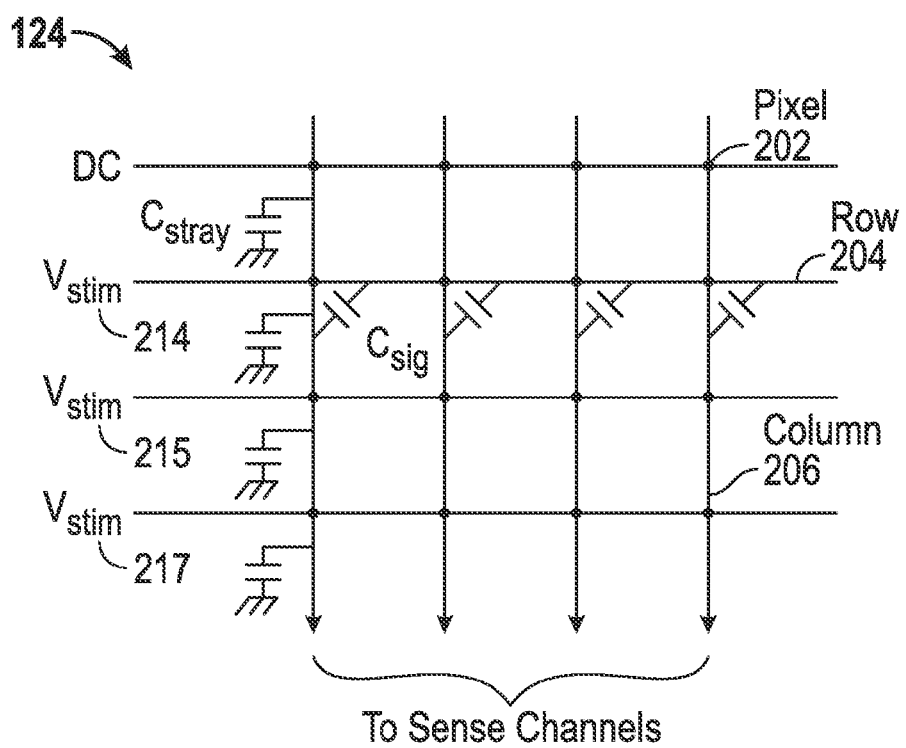
FIG. 2a illustrates an exemplary mutual capacitance touch sensor panel according to one example of the disclosure.

FIG. 2a is a partial view of example touch sensor panel 124 that shows more detail according to examples of the disclosure. FIG. 2a indicates the presence of a stray capacitance Cstray at each pixel 202 located at the intersection of a row 204 and a column 206 trace (although Cstray for only one column is illustrated in FIG. 2a for purposes of simplifying the figure). In the example of FIG. 2a, drive signals transmitted by transmit section 114 can be applied to the rows of touch panel. For example, AC stimulus Vstim 214, Vstim 215 and Vstim 217 can be applied to several rows, while other rows can be connected to DC. Vstim 214, Vstim 215 and Vstim 217 can be, for example, signals having different phases, as will be explained later. Each stimulation signal on a row can cause a charge Qsig to be injected into the columns through the mutual capacitance present at the affected pixels, where:

$$Q\text{sig} = C\text{sig} \times V\text{stim} \tag{0}$$

A change in the injected charge (Qsig_sense) can be detected when a finger, palm or other object is present at one or more of the affected pixels. Vstim signals 214, 215 and 217 can include one or more bursts of sine waves, square waves, etc. Vstim signals could be comprised of signals with one specific phase, amplitude and frequency but could be composite in nature, e.g. can be comprised of multiple signals, each having a specific phase, amplitude and frequency. Each signal component could be frequency, phase or amplitude modulated. For example, amplitude modulation can be used for windowing purposes to provide a stimulus signal that is narrow band and has little harmonic content as to prevent unwanted noise sources to enter the receive channel. For example, having a stimulus signal with a square wave-shape has higher order harmonics. These higher order harmonics may cause in band noise components due to intermodulation between external noise components with the higher order harmonics of the stimulus. Note that although FIG. 2a illustrates rows 204 and columns 206 as being substantially perpendicular, they need not be so aligned, as described above. Each column 206 can be connected to a sense channel, for example.

Figure 2B:
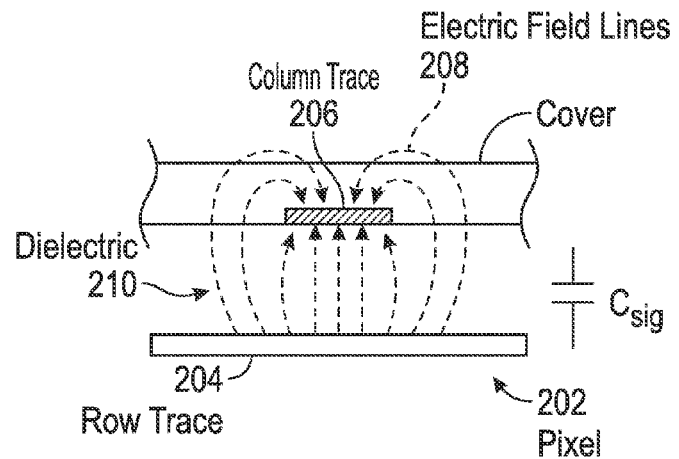
FIG. 2b is a side view of an exemplary pixel in a steady-state (no-touch) condition according to one example of the disclosure.

FIG. 2b is a side view of example pixel 202 in a steady-state (no-touch) condition according to examples of the disclosure. In FIG. 2b, an electric field of electric field lines 208 of the mutual capacitance between column 206 and row 204 traces or electrodes separated by dielectric 210 is shown.

Figure 2C:
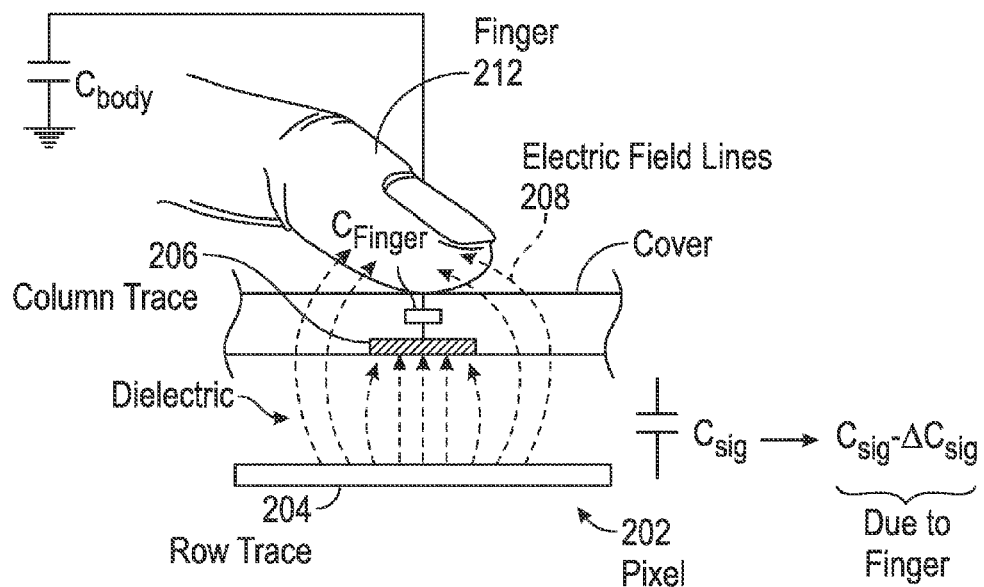
FIG. 2c is a side view of an exemplary pixel in a dynamic (touch) condition according to one example of the disclosure.

FIG. 2c is a side view of example pixel 202 in a dynamic (touch) condition. In FIG. 2c, finger 212 has been placed near pixel 202. Finger 212 is a low-impedance object at signal frequencies, and has an AC capacitance Cfinger from the column trace 204 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig−ΔCsig, where Csig represents the static (no touch) component and ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (e.g., a range from "no-touch" to "full-touch").

Figure 3A:
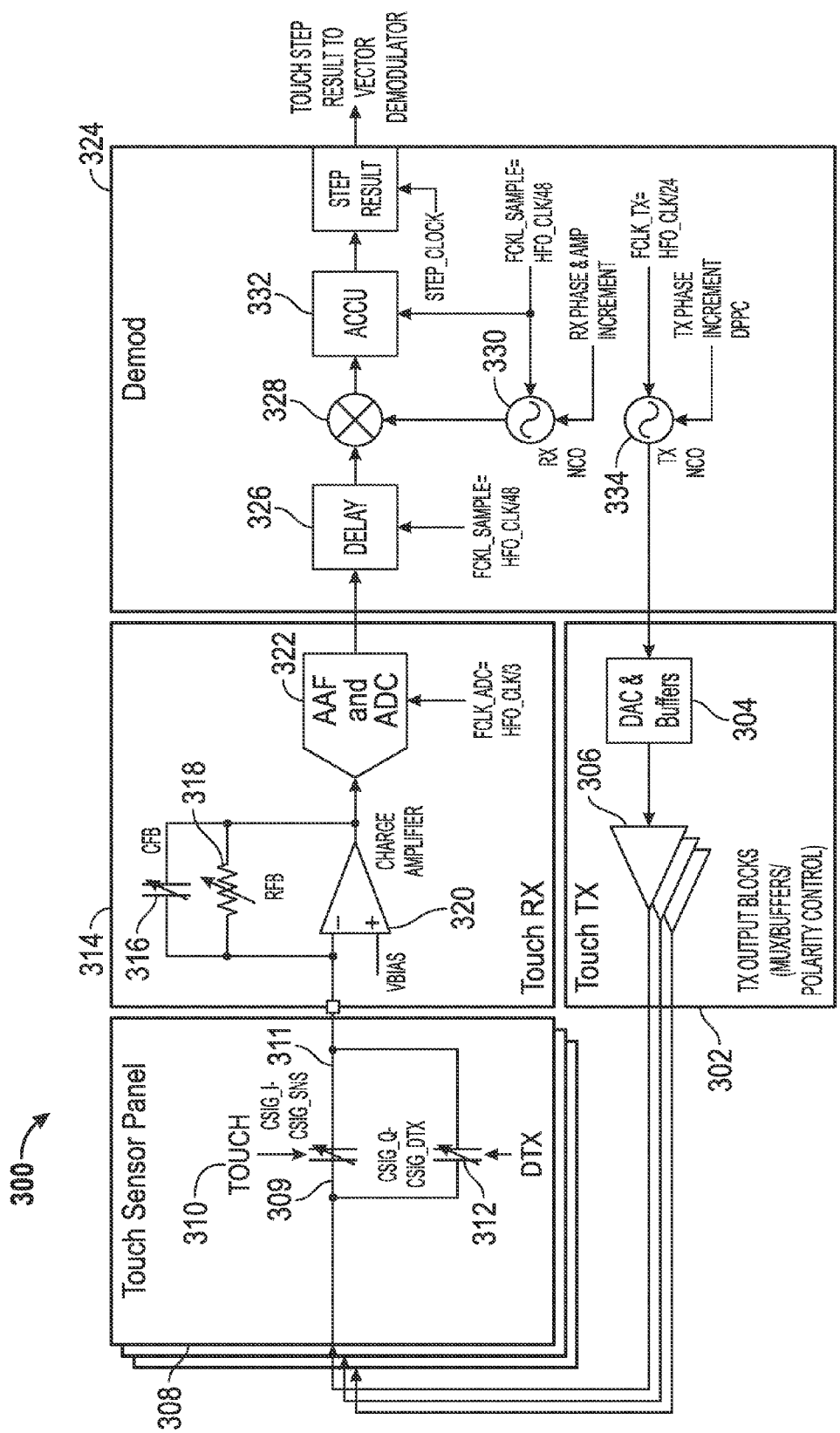
FIG. 3a illustrates an exemplary touch controller according to examples of the disclosure.

FIG. 3a illustrates an exemplary touch controller according to examples of the disclosure. The touch controller 300 can be broken into parts, with each part performing a particular function related to touch detection. For instance, touch detection circuit 300 can include a touch transmit circuit 302. Touch transmit circuit 302 can be configured to provide stimulation signals to the drive lines as described above. Touch transmit circuit 302 can include Transmit Numerically Controlled Oscillator (Tx NCO) 334 that can be configured to provide a digital waveform. TX NCO 334 can be used to create the stimulation signals needed for touch detection as described above with reference to FIG. 2. The output of TX NCO 334 can be fed into Digital to Analog converter (DAC) 304. DAC 304 can covert the digital waveform provided by TX NCO 334 to analog signals that can be used as stimulation signals on the touch sensor panel. The output of the DAC 304 can be fed into a plurality of transmit output blocks 306 that can provide multiplexing, buffering and polarity control to the waveforms generated by DAC 304.

The stimulation signals are then sent to touch sensor panel 308. Touch sensor panel 308 can include a plurality of drive lines 309 and sense lines 311 as described above. When the drive lines are stimulated by the stimulation signals provided by touch transmit circuit 302, a portion of the signal can be coupled to a plurality of sense lines 311 via the mutual capacitance 310 created between the crossing or adjacency of a drive line with a sense line. The mutual capacitance 310 between a drive line and a sense line can vary depending on the proximity of a user's finger or other object to the crossing or adjacency of a drive line and sense line. The signal transmitted on the sense line can be characterized by equation 1 below:

$$(s^* C_o)/(1 + \tau_1 {}^* s) \tag{1}$$

wherein s represents the complex frequency, $C_o$ represents the mutual capacitance between the drive line and sense line, and $\tau_1$ represents the RC time constant of the circuit.

Another portion of the stimulation signal transmitted on a drive line can be coupled to a parasitic pathway 312 created by electronics that are proximal to the touch sensor panel. When a stimulation signal is applied by the touch transmit circuit 302 to a drive line, the parasitic capacitive pathways can create alternate ways for charge to be coupled onto the sense lines from the drive lines. As illustrated, the first pathway can represent the mutual capacitance 310 between the drive line and the sense line described above and characterized by equation (1). A second pathway can be created via the mutual capacitance between the drive line and a proximal electrical component such as the display, and the mutual capacitance between the display and the sense line. The parasitic pathway (DTX pathway) can be represented by capacitor 312 that is in parallel to the mutual capacitance 310 being sensed for touch detection. Charge from the touch transmit circuit 302 can be coupled onto the display and then from the display to the sense line. This series of couplings can thus couple a second signal onto sense line for detection by a detection circuit 314. The signal created by the second pathway can be characterized by the following equation:

$$(s^2 * R_g * C_1 * C_2)/(1 + \tau_2 * s) \tag{2}$$

wherein $R_g$ represents the effective resistance of the display, $C_1$ represents the mutual capacitance between the drive line and the display, $C_2$ represents the mutual capacitance between the sense line and the display, and $\tau_2$ represents the RC time constant of the parasitic pathway. $\tau_2$ can be represented by the equation:

$$R_g * (C_1 + C_2 + C_3) \tag{3}$$

wherein $C_3$ represents the effective capacitance of the display. The effective capacitance of the display can be an amalgamation of various capacitances created by display electronics such as the data lines, pixel electrodes and common electrodes. The effective resistance of the display $R_g$ can be a product of the metal used to create the components of the display.

Equation 4 below can represent the effective signal seen by detection circuitry 314, which is the combination of the signals from both pathways:

$$(s * C_o)/(1 + \tau_1 * s) + (s^2 * R_g * C_1 * C_2)/(1 + \tau_2 * s) \tag{4}$$

As illustrated by equation 4, the effective signal seen by the detection circuitry 314 can depend on the frequency and phase of the stimulation signal generated by the touch due to its dependency on the complex frequency s.

Detection circuitry 314 can include charge amplifier 320 that is connected via its inverting input to the sense line, and to a voltage bias via its non-inverting input. The charge amplifier 320 can be also be connected at its non-inverting input to a feedback capacitor 316 and a feedback resistor 318 both of which can be connected to the output of the charge amplifier. This configuration can allow for changes in the mutual capacitance 310 caused by a finger or other object to be detected per equations 1-4 above. Detection circuitry 314 can also include an Anti-Aliasing Filter (AAF) and an Analog to Digital Convertor (ADC) 322 that can low pass filter and convert the analog signals at the output of charge amplifier 320 to digital signals for further processing The output of detection circuitry 314 can be passed to demodulation circuitry 324. Demodulation circuitry 324 can include programmable delay 326, mixer 328 and accumulator 332 and an output register. Mixer 328 can be connected to a Receiver Numerically Controlled Oscillator (RX NCO) 330. The RX NCO 330 can provide a periodic signal to mixer 328 for the purpose of homodyne detection of the input signal to the demodulation circuit 324. The programmable delay 326 can be used to adjust the phase of the incoming signal so as to tune the signal to the RX NCO 330. After the signal has been mixed with RX NCO 330, it is then fed into an accumulator 332 that can act as a digital integration of the signal for the purpose of detection. An output register REG can then store the accumulated step result after integration across INT-NUMVAL integration cycles upon the assertion of Step Clock. A baseline scalar can be applied to the output of the output register prior to further processing by a vector demodulator.

FIG. 3b illustrates an example master clock that can be employed by a touch controller according to examples of the disclosure. The master clock can include a high frequency oscillator (HFO) that takes a reference clock at its input as well as a digital vector MVAL_AGILE. The reference clock signal can come from the device in which the touch controller is situated such as a tablet computer or mobile phone. The MVAL_AGILE vector can also be provided by the device and can be used to instruct the HFO 340 to change its frequency according to the following equation:

$$FCLK\_HFO = MVAL\_AGILE * Reference\_Clock \tag{5}$$

In some examples, the placement of the touch controller can bring it into close proximity with a communications portion of the device, for instance the cellular communications portion of a mobile telephone. While the frequency of the HFO clock of the touch controller can be spectrally separated from the cellular communications frequency spectrum, harmonics of the HFO clock can interfere with the cellular communications. Therefore a device, such as a mobile phone, may need to adjust the frequency of the HFO clock depending on the frequency being used for cellular communications. As known in the art, the frequency being used for cellular communications can change depending on certain factors such as which cellular protocol is being used, the location of the cell tower communicating with the device, etc. Therefore, at certain times the touch controller and more specifically the HFO master clock may not be interfering with cellular function, and at other times there may be interference. In light of this interference, the device can supply the MVAL_AGILE to the HFO clock, which can instruct the HFO clock to change its frequency.

Referring back to FIG. 3a many components of the touch detection circuit 300 can depend on the HFO clock. For example, the TX NCO 334, the RX NCO 330, the accumulator 332 and the programmable delay 326 can all take divided versions of HFO clock at their inputs in order to provide various functions necessary for touch detection. Therefore changing the frequency of the HFO clock can alter the performance of these components as will be explained below. Furthermore as illustrated in equations 1-4, changes to the HFO frequency could cause changes to the signals being received by detection circuit 314.

FIG. 4 illustrates an exemplary numerically controlled oscillator according to examples of the disclosure. The NCO of FIG. 4 can be implemented for both the TX NCO and RX NCO described above in reference to FIG. 3a. The NCO can include a sine phase accumulator 402, sine lookup table 406, mixer 410, amplitude phase accumulator 404 and amplitude lookup table 408. The programmable phase increment sine_phase_inc determines the frequency of the stimulation/demodulation waveform. The phase accumulator 402 accumulates the sine phase increment sine_phase_inc. The output of the sine phase accumulator 402 represents an address into the sine lookup table 406. The synthesized waveform out of the sine lookup table 406 has a constant amplitude which then is envelope shaped by multiplying it with the envelope. The envelope shape is stored in an envelope lookup table 408 and is retrieved from the amplitude LUT at a rate set by the amplitude phase increment amp_phase_inc. Similarly to the sine phase increment, the amplitude phase increment amp_phase_inc is accumulated by an amplitude phase accumulator 404. The output of the amplitude phase accumulator 404 represents an address into the envelope look up table 408. One possible benefit of envelope shaping is that the spectral properties of the pass-band of the demodulation can be precisely controlled. The frequency response of the demodulation can essentially be the convolution of the time domain representation of the envelope and the sine wave out of the sine lookup table 406. For example, for a rectangular window, the frequency domain representation of the demodulation would be a single frequency component convoluted with the time domain representation of the rectangular window (sin c function sin(x)/x). By using an appropriate window functions such as Chebychev or Gaussian windows, the passband response can be optimized to fit a given application.

The sine NCO comprised of ACCU block 404 and SineLUT 406 produces an output that is proportional to Sine (2*PI( )*FSTM*t) in the time domain. The variable t can be discretized in increments of the receive channel clock NCNT/FCLK_RX, where NCNT can represent an integration count and ranges from 0 to INTVALNUM, which specifies number of integration cycles over which demodulated and phase corrected ADC samples are integrated. FCLK_RX can be the frequency at which the receive channel (including ADC) operates. The coefficients of the sine( ) function for one sine cycle can be stored in Sine LUT. Since the term 2*PI can represent the length of one sine cycle it can be equivalent to the size SINE_LUT_SIZE of Sine LUT. Therefore the output of Sine LUT block 406 can be represented with the following function:

$$SINE\_LUT(SINE\_LUT\_SIZE*FSTM/FCLK\_RX*NCNT) \quad (6)$$

FCLK_RX is the frequency at which the receive channel logic processes digitized touch data and is a divided version of the HFO clock as follows:

$$FCLK\_RX=FCLK\_HFO/NDIV\_RX \quad (7)$$

NDIV_RX is the divide ratio between the receive channel clock and the HFO clock. With above substitutions the sine LUT can produce an output of $$Sine\,LUT(Sine\_Phase\_inc*NCNT) \quad (8)$$

Wherein Sine_Phase_Inc is the sine NCO phase increment given by the equation:

$$Sine\_Phase\_Inc=SINE\_LUT\_SIZE*FSTM*NDIV\_RX/FCLK\_HFO \quad (9)$$

Those skilled in the art will recognize that the sine NCO phase increment needs to be calculated based on the operating frequency FCLK_HFO of the HFO. As an example, the amplitude table can produce data according to the following function:

$$AMP\_LUT[Amp\_Phase\_Inc*NCNT] \quad (10)$$

Here AMP_LUT is a memory of size AMP_LUT_SIZE containing the envelope coefficients and NCNT the integration count ranging from 0 to INTVALNUM. For NCNT=INTVALNUM the pointer into the amplitude table can be equal to the size of the amplitude table, i.e.

$$Amp\_Phase\_Inc*INTVALNUM=AMP\_LUT\_SIZE \quad (11)$$

Therefore, the amplitude increment can be calculated as follows:

$$Amp\_Phase\_Inc=AMP\_LUT\_SIZE/INTVALNUM \quad (12)$$

Note that INTVALNUM can determine the number of samples to be integrated to compute a step result and can relate to the integration time TINT defined as $$TINT=INTVALNUM/FCLK\_RX \quad (13)$$

The integration time can influence the bandwidth of demodulation according to the following function:

$$FBW=BETA/TINT=BETA*FCLK\_RX/INTVALNUM \quad (14)$$

Wherein BETA is a bandwidth correction factor for the window used, and FBW represents the bandwidth of the demodulation. Since FCLK_RX is a function of the HFO frequency any change to the HFO frequency will cause a variation of FBW, therefore affecting the touch step result. Therefore FBW (and thus the integration time TINT) needs to remain constant regardless of a change to the HFO clock frequency, which requires scaling of parameter INTVALNUM $$INTVALNUM=TINT*FCLK\_RX \quad (15)$$

Substituting this into the formula for the amplitude phase increment we obtain:

$$Amp\_Phase\_Inc=AMP\_LUT\_SIZE/(TINT*FCLK\_RX) \quad (16)$$

Figure 5:
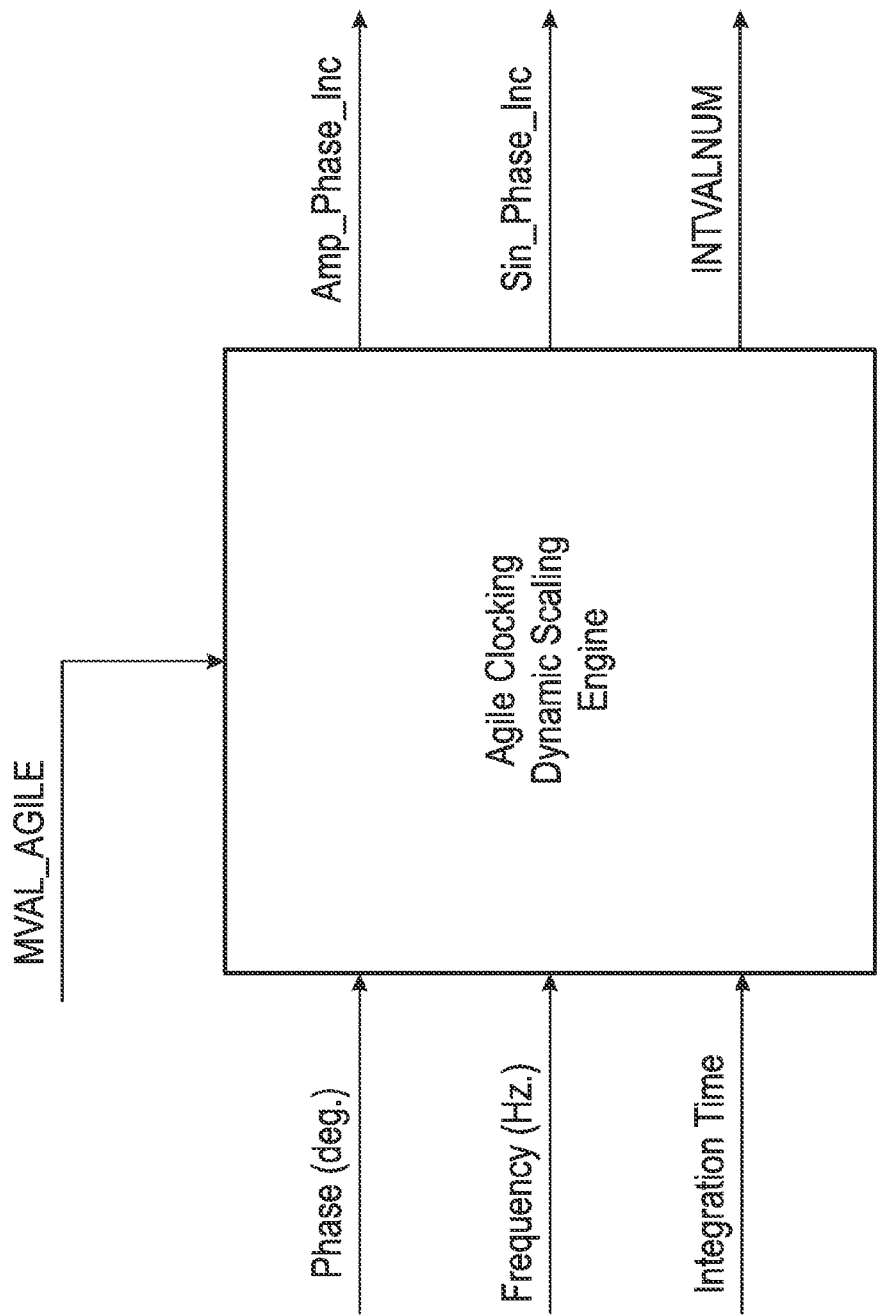
FIG. 5 illustrates an exemplary agile clocking dynamic scaling engine according to examples of the disclosure.

FIG. 5 illustrates an exemplary agile clocking dynamic scaling engine according to examples of the disclosure. As described above, if an HFO master clock is allowed to change its frequency, in order to maintain substantially uniform touch detection performance that is relatively impervious to the changing clock frequency, certain parameters of the device can be scaled to maintain substantially constant performance. Agile clocking dynamic scaling engine ("scaling engine") 500 can take at its input the phase 502 and frequency 504 of the reference clock that is being provided by the host device. The scaling engine 500 can also take the MVAL_AGILE signal 508 provided by the host device as an input. When presented with the information relating to the phase and frequency of the reference signal and the value of MVAL_AGILE, the scaling engine 500 can translate changes in the time domain such as HFO master clock frequency to changes for various parameters of the touch controller in the sample domain, thereby maintaining uniform performance of touch detection despite changing master clock frequencies.

As an example, as discussed with reference to FIG. 4 and equation 5, when the HFO master clock changes, the value of sin_phase_inc can be scaled in order to maintain a constant stimulation frequency. The scaling engine 500 can detect changes in MVAL_AGILE 508 which in turn can alert the scaling engine to changes in the HFO master clock. When a change is detected, the scaling engine 500, in accordance with equation 5, can adjust the sin_phase_inc output 510 such that the frequency provided by the TX and RX NCO is held constant. With the substitution FCLK_HFO=MVAL_AGILE*FCLK_REF the sine phase increment can be computed as a function of MVAL_AGILE as follows:

$$Sine\_Phase\_Inc(MVAL\_AGILE)=SINE\_LUT\_SIZE*FSTM*NDIV\_RX/(MVAL\_AGILE*FCLK\_REF) \quad (17)$$

The sin_phase_inc output of the scaling engine 500 can be transmitted to the TX and RX NCO and be used as an input 412 by the TX and RX NCO.

In another example illustrated in FIG. 5, the scaling engine 500 can also convert changes in the frequency of the HFO clock, to changes in the number of samples taken by the accumulator 332 of FIG. 3a in order to maintain a constant time domain integration window. As discussed above, changes in the frequency of the HFO master clock can cause changes to the integration time of the accumulator if the number of samples taken by the accumulator is held constant. The scaling engine 500 can output a signal INTVALNUM 512 which is sent to the accumulator to let it know how many samples to take per integration window. When the scaling engine 500 detects changes in MVAL_AGILE, it can subsequently scale the INTVALNUM 512 output in order to maintain the integration time of the accumulator 332. With the substitution FCLK_RX=MVAL_AGILE*FCLK_REF/NDIV_RX parameter, INTVALNUM can be computed as a function of MVAL as follows:

$$\text{INTVALNUM}(M\text{VAL\_AGILE}) = \\ \text{TINT}*M\text{VAL\_AGILE}*F\text{CLK\_REF}/N\text{DIV\_RX} \quad (18)$$

In addition, the amplitude increment Amp_Phase_Inc can be scaled by substituting the above formula in the calculation of the amplitude increment:

$$\text{Amp\_Phase\_Inc}(M\text{VAL\_AGILE}) = \text{AMP\_}LUT\text{\_SIZE}/ \\ \text{INTVALNUM} \quad (19)$$

$$\text{Amp\_Phase\_Inc}(M\text{VAL\_AGILE}) = \text{AMP\_} \\ LUT\text{\_SIZE}*N\text{DIV\_}RX/ \\ (\text{TINT}*M\text{VAL\_AGILE}*F\text{CLK\_REF}) \quad (20)$$

In some examples, scaling parameters in the sample domain to accommodate changes in the time domain can introduce additional noise to the touch detection system. As an example, using FIG. 3a as a reference, when the number of samples taken by accumulator 332 is scaled based on a change to the HFO master clock frequency, it can cause a quantization error at the accumulator. This quantization error can result from the fact that when the number of samples taken by the accumulator for a given integration window is altered, the time domain waveform is sampled at different points along the signal. For instance, one period of a sine wave that is sampled 100 times per period will be sampled at different times throughout the signal as compared to a sine wave that is sampled 80 times per period. This difference in sampling locations of the signal can cause a quantization error, since the change in the number of samples taken by the accumulator can cause the resultant digital signal to appear slightly shifted in phase.

The "shift in phase" caused by increasing or decreasing the number of samples taken by the accumulator can be compensated for by the programmable delay 326 illustrated in FIG. 3a. By adjusting the delay to account for the quantization error, touch performance can be maintained despite the quantization error. However, conventional programmable delay units may not possess the granularity required to correct for the quantization error. In other words, the quantization error may cause a phase error that is large enough to cause compromised touch detection performance, but the resolution of the programmable delay may be too coarse to correct for the quantization error.

Figure 6:
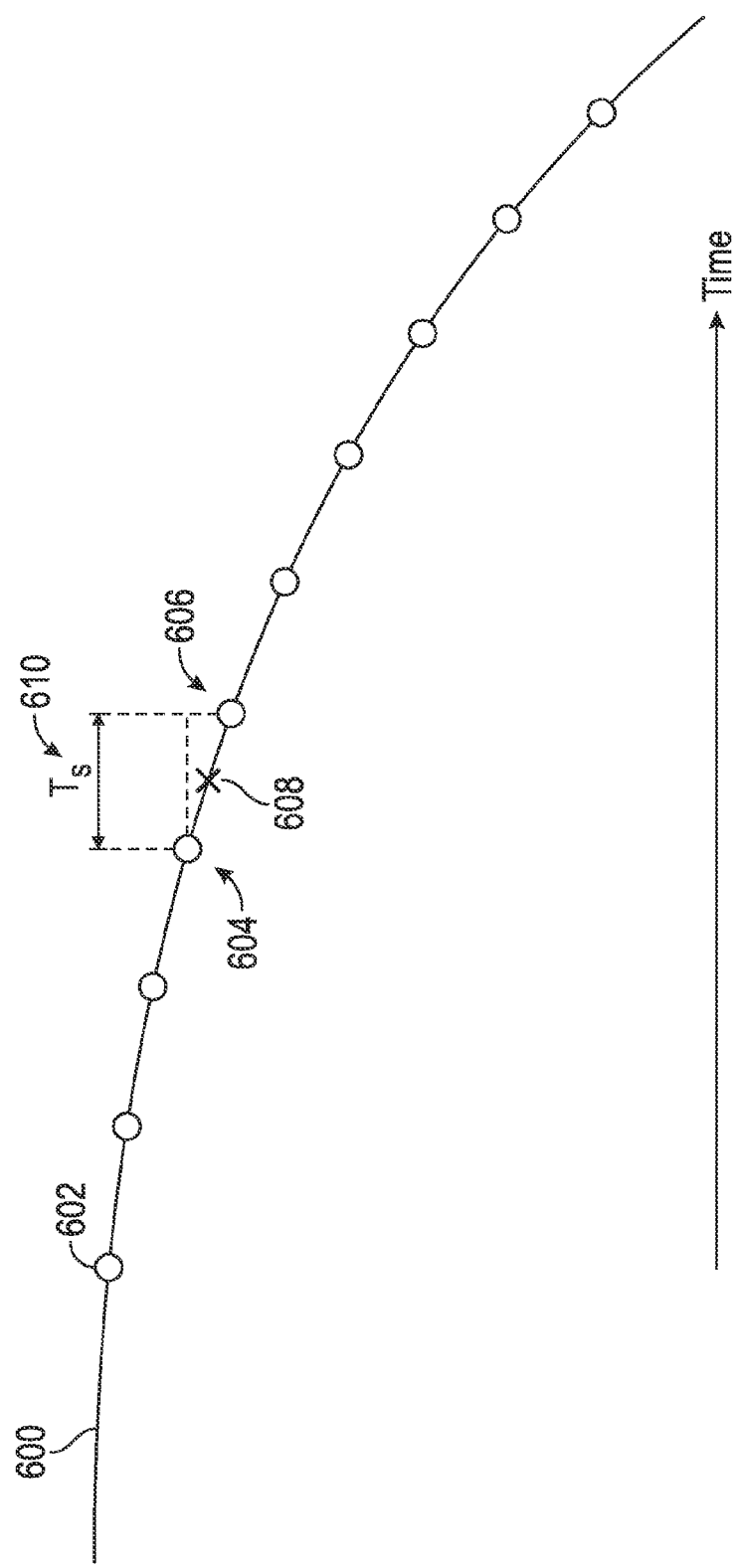
FIG. 6 illustrates an exemplary time domain plot of a periodic signal according to examples of the disclosure.

FIG. 6 illustrates an exemplary time domain plot of a periodic signal according to examples of the disclosure. The periodic signal can be sampled at periodic intervals represented by circles on the plot. Each sample 602 can represent the value of the periodic function at a particular moment in time. Each sample 602 can be stored into a shift register or other memory device. In order to control the delay, the samples can be shifted in time such that an artificial delay of the signal is created. As an example, when there is no delay, the samples 602 are outputted from the programmable delay 326 as soon as the sample is taken by the ADC 322. A delay of one sample can be created by outputting the sample taken at time t−1 in the previous sampling period at a time t. In this example, the granularity of the programmable delay can be constrained by the sampling period 610 represented by the variable Ts. The delay can be adjusted in increments that are multiples of the sampling period. The sampling period Ts can be a function of the FS_ADC input to the programmable delay 326 illustrated in FIG. 3a. As illustrated in FIG. 3a, FS_ADC can be a function of the HFO master clock frequency.

When the HFO master clock is adjusted by the host device, the constraint on the granularity of the programmable delay may not be fine enough to capture the change in phase created by the quantization error as discussed above. For instance, as illustrated on FIG. 6, sample 604 and 606 are adjacent samples in time to one another. After changing the number of samples taken by the accumulator, the quantization error can cause a phase delay represented by the distance in time between point 608 and sample 604. Since the minimum delay adjustment means that the programmable delay can only be adjusted between sample 604 and 606, the quantization error may not be able to be compensated for since the error lies in between adjacent sampling points 602. If the programmable delay shifts the signal such that sample 606 is outputted at time t, the quantization error may still be present.

In some examples, scaling parameters in the sample domain to accommodate changes in the time domain can introduce additional noise to the touch detection system. This additional noise component can be due to quantization of timing signals such as DCL and INTVALNUM. For example, DCL, which adjusts the demodulation phase, can only be adjusted in increments of the sample clock FS_ADC. In other words, the minimum phase resolution according to the above equations can be:

$$d\text{Phase} = 360 \text{ deg}*F\text{STM}/F\text{S\_ADC} \quad (21)$$

For example, if FSTM=300 KHz and FS_ADC=48 MHz then the demodulation phase resolution can be 2.25 deg. This phase resolution may be too coarse to correct for the quantization error that can be caused by the changing HFO clock, and may lead to degraded performance of the touch input device. Therefore the phase resolution of the programmable delay may need to be increased in order to accommodate a changing HFO clock frequency.

Figure 7:
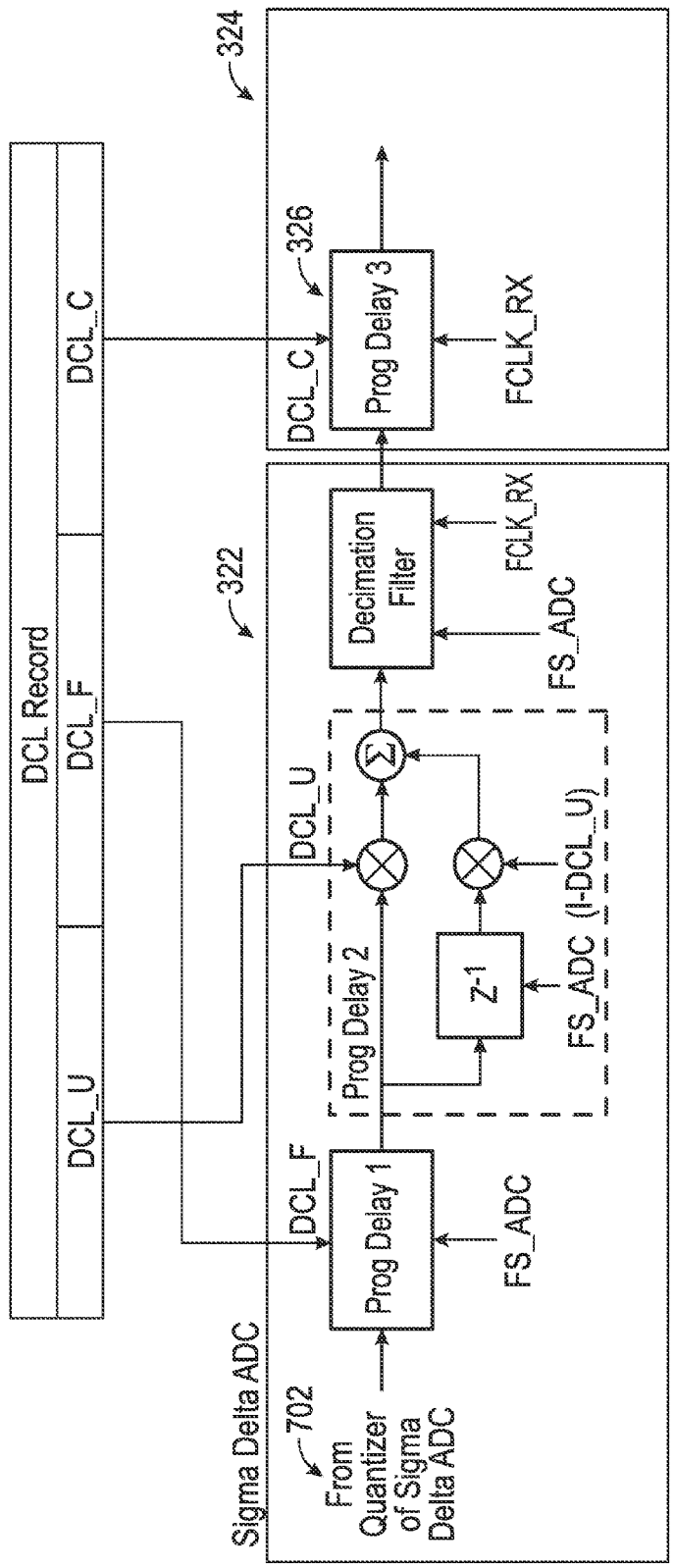
FIG. 7 illustrates an exemplary programmable delay unit with fine adjustment capability according to examples of the disclosure.

FIG. 7 illustrates an exemplary programmable delay unit with fine adjustment capability according to examples of the disclosure. The delay unit can be comprised of multiple delay elements. In one exemplary embodiment, Prog. Delay 1 and Prog. Delay 1 can be included as part of the backend processing of a sigma-delta ADC 322, Prog. Delay 3 can be part of the demod. block 324. Prog delay 1 can delay the raw ADC data from the ADC quantizer in increments of the ADC sampling clock FS_ADC, Prog. Delay 2 can further delay the ADC data at a finer resolution than FS_ADC. A Decimation Filter can filter and decimate the ADC data from sampling rate FS_ADC to FS_RX. Decimated ADC data can be further delayed by Prog delay 3 in increments of the decimated ADC clock FCLK_RX. The achievable phase resolution for Prog Delay 1 is limited by the highest clock rate of ADC 322. In some embodiments FS_ADC can be 48 MHz and FS_RX=4 MHz so the decimation rate is 12×1 and thus the phase resolution can be limited to 2.25 deg at FSTM=300 KHz as shown in an earlier example. Finer phase resolution can be needed to meet the touch SNR requirements (see example above). Prog. Delay 2 and be utilized to achieve finer phase delay using phase interpolation. The output of Prog. Delay is split into two paths. In the first path the signal in multiplied at 706 by a constant DCL_U. The second path is first fed into a delay block 704 that delays the incoming signal by one sample. The output of delay block 704 is then multiplied at 708 by a constant (1−DCL_U). Note that DCL_U is a digital value representing a number between 0 and 1. For example, if DCL_U is a 8 bit number, the digital representation of (1−DCL_U) would be (255−DCL_U). The signals of the two paths are then summed at 710. By creating two signal paths, delaying one of the paths by one sample, and multiplying each path by a fixed constant and then summing paths together, in essence a linear interpolation between adjacent samples in time is being performed. Using FIG. 6 as example, the first path can be represented by sample 606, while the second path can be represented by sample 608. By multiplying sample 606 and 608 by constants and then summing them together, a linear interpolation is achieved between the points thus allowing the programmable delay to be tuned to the point 608. The amount of interpolation between the two points can be controlled by adjusting DCL_U. DCL_U, DCL_F and DCL_C make up a DCL record. In some embodiments, DCL_F and DCL_C can have a resolution of 4 bits and DCL_U of 8 bits. Therefore the DCL record can have a resolution of (8+4+4)=16 bits with resolution Ts/(2^8−1). In other words, DCL_U=DCL[15:8], DCL_F=DCL[7:4] and DCL_C=DCL[3:0].

Figure 8:
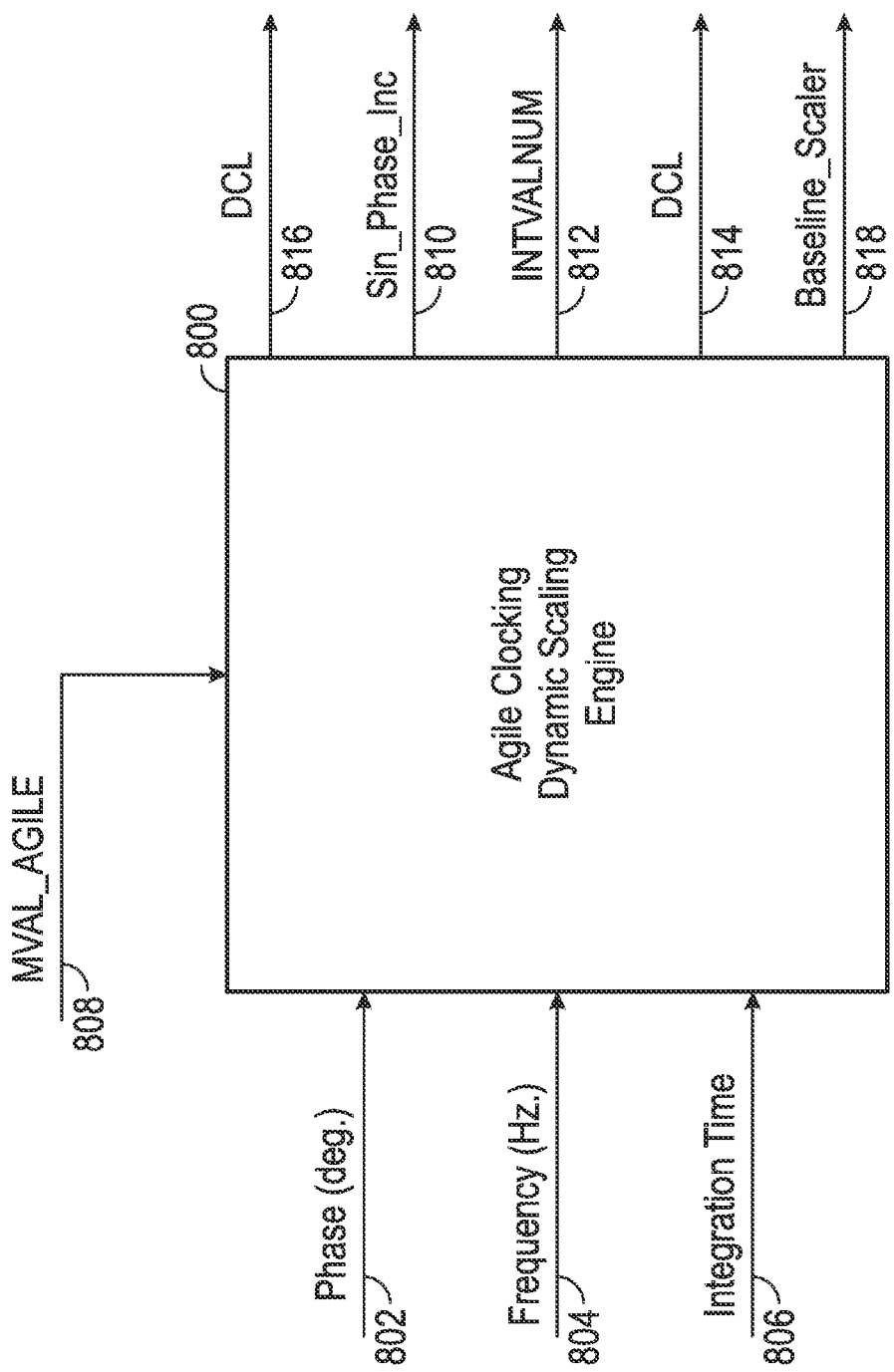
FIG. 8 illustrates another exemplary scaling engine according to examples of the disclosure.

FIG. 8 illustrates another exemplary scaling engine according to examples of the disclosure. Scaling engine 500 can also include a phase adjustment. Parameter DCL 816 can be adjusted as a function of the HFO clock FCLK_HFO in order to maintain the demodulation phase of the receive channel regardless of the HFO clock. DCL is related to the demodulation phase PHASE (in deg.) as follows:

$$DCL = PHASE * FCLK\_RX * (2^{NBITS\_DCL}) / (360 * FSTM) \quad (22)$$

NBITS_DCL specifies the DCL granularity. The DCL granularity determines the phase resolution based on the smallest DCL step TDCL in the time domain:

$$TDCL = 1/(FCLK\_RX * (2^{NBITS\_DCL}))$$

For FCLK_RX=4 MHz and NBITS_DCL=4 BITS, the smallest equivalent time step is 15.625 ns and the associated minimum phase can be calculated by applying equation (21) with substitution of 1/FS_ADC=TDCL.
For example, at FSTM=300 KHz the phase resolution dPhase is 1.6875 deg
Note that FCLK_RX is given by $$FCLK\_RX = FCLK\_REF * MVAL / N\_DIV\_RX \quad (23)$$

By Substitution of (23) in (22) we obtain DCL as a function of MVAL:

$$DCL(MVAL) = PHASE * FCLK\_REF * MVAL * NBITS\_DCL / (360 * FSTM * N\_DIV\_RX) \quad (24)$$

The Agile Clocking Dynamic Scaling Engine can also include a baseline_scaler output 818. The baseline_scaler output is described in further detail below.

Figure 9:
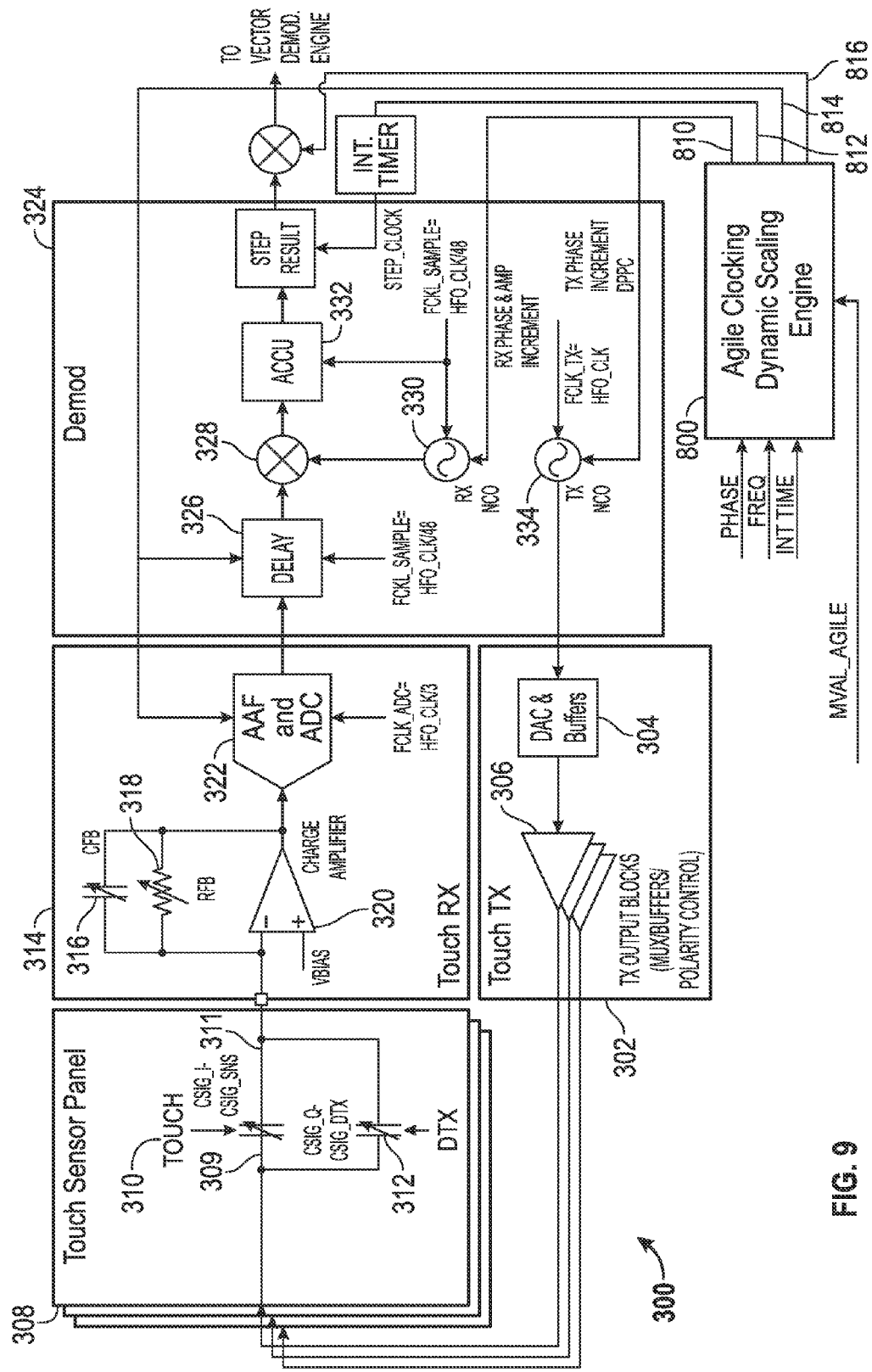
FIG. 9 illustrates an exemplary touch controller with an agile clock scaling engine according to examples of the disclosure.

FIG. 9 illustrates an exemplary touch controller with an agile clock scaling engine according to examples of the disclosure. FIG. 9 illustrates how the touch controller of FIG. 3a can be integrated with the scaling engine described in FIG. 8. As illustrated, the scaling engine 800 can receive the phase, frequency, MVAL_AGILE and integration time as discussed with reference to FIG. 5. The outputs of the scaling engine can be routed to the appropriate components of the touch controller in order to perform the necessary sample domain scaling to maintain substantially uniform touch performance in light of a changing master clock. For instance, output 810, the phase increment output as described above, can be routed to the TX NCO 334 and RX NCO 330 so that the stimulation and demodulation frequencies are held substantially constant despite changes to the master clock. Output 812, the INTVALNUM output as described above, can be routed to a timer that generates signal STEP_CLOCK, whose period is equivalent to the integration time and loads the accumulated result in ACCU into register STEP_RESULT after integration over INTVALNUM samples. INTVALNUM is changed as a function of the HFO clock as to keep the STEP_CLOCK and therefore the integration time constant regardless of changes in HFO clock. Output 814, the DCL output as described above, can be routed to the programmable delay block 326 and ADC backend processing block, in order to provide the phase granularity that can be required when converting time domain changes to sample domain changes.

Figure 10:
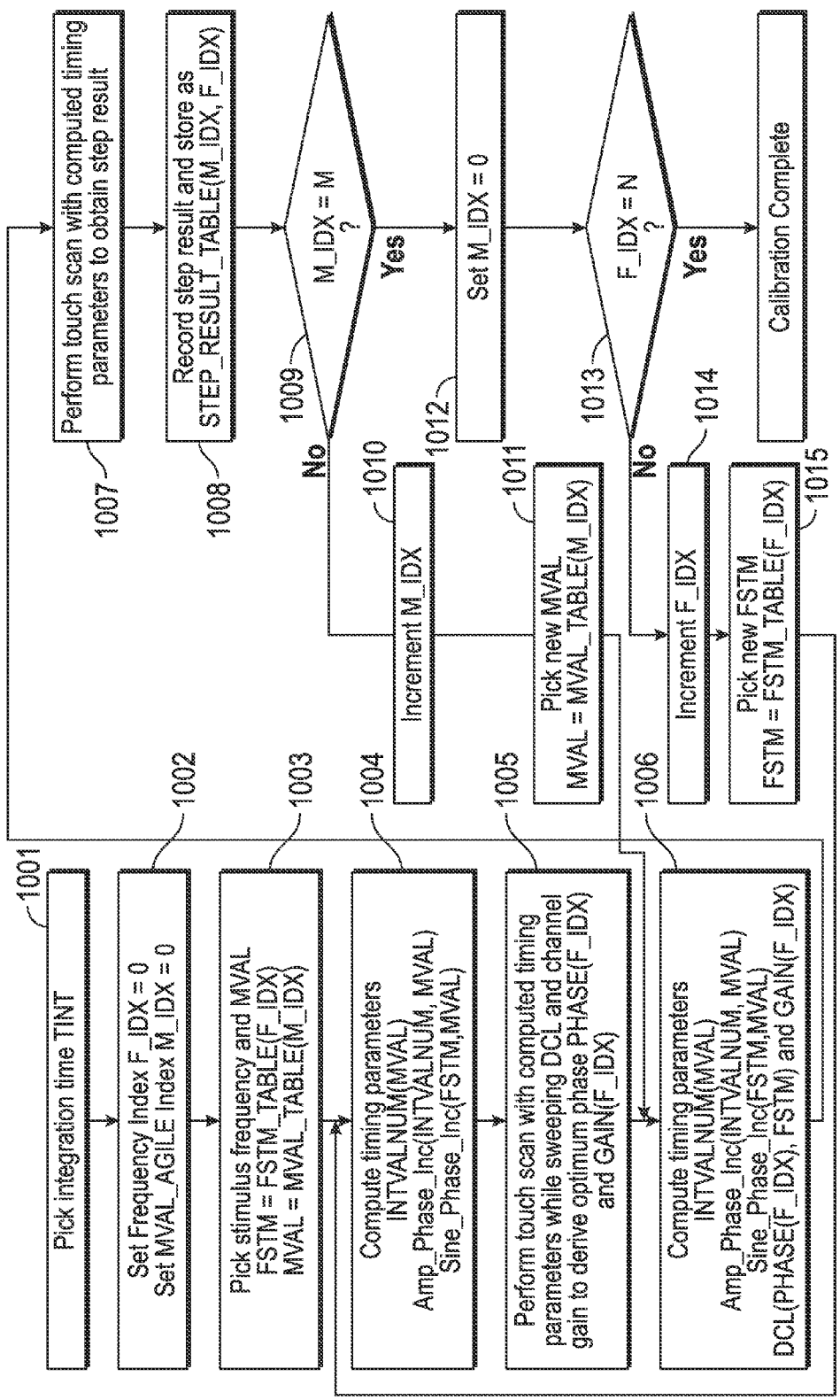
FIG. 10 illustrates an exemplary calibration process of the touch controller according to examples of the disclosure.

FIG. 10 illustrates an exemplary calibration process of the touch controller according to examples of the disclosure. The calibration process of FIG. 10 can be used to derive channel gain, channel phase and a step results matrix based on a set of stimulus frequencies stored in FSTM_TABLE and a set of MVALs stored in MVAL_TABLE. At step 1001 an integration time TINT can be selected by the controller. At step 1002 the frequency index F_IDX into the frequency table FSTM_TABLE and index M_IDX into the MVAL table MVAL_TABLE can be set to zero. At step 1003 the stimulus frequency FSTM and MVAL can be picked from FSTM_TABLE and MVAL_TABLE based on the frequency and MVAL indices, respectively. At step 1004, the Agile Clocking Dynamic Scaling Engine 500 can compute sample domain parameters INTVALNUM, Amp_Phase_Inc and Sine_Phase_Inc based on the selected stimulus frequency FSTM and MVAL. At step 1005 a touch scan can be performed while sweeping DCL and the channel gain to find the optimum PHASE and GAIN for the selected stimulus frequency FSTM. PHASE can represent the optimum demodulation phase at which the touch signal SNR is maximum. At step 1006, the Agile Clocking Dynamic Scaling Engine 500 can compute sample domain parameters INTVALNUM, Amp_Phase_Inc, Sine_Phase_Inc and DCL based on the selected stimulus frequency FSTM, MVAL and demodulation phase PHASE.

At step 1007 a touch scan can be performed to obtain a step result for the given stimulus frequency and MVAL. At step 1008 the obtained step result is stored in a step result table labeled as STEP_RESULT_TABLE. At step 1009 the MVAL index M_IDX can be compared against M, which can represent the maximum number of MVAL values. IF M_IDX=M then the MVAL index M_IDX can be incremented and a new MVAL can be picked from the MVAL table MVAL_TABLE. Steps 1006 to 1008 are repeated to obtain and record step results for the remaining MVALs. At step 1012 the MVAL index is set to 0 and the frequency index F_IDX is compared to N, which can represent the maximum number of stimulus frequencies in the stimulus frequency table FSTM_TABLE. If F_IDX is smaller than N, the frequency index F_IDX can be incremented and a new stimulus frequency can be picked from the frequency table FSTM_TABLE. In the subsequent steps 1004 and 1005 calibration is performed to determine the optimum demodulation phase (PHASE) and channel gain (GAIN) based on the new stimulus frequency. Step results are obtained and recorded for all MVAL values and the new stimulus frequency. The whole process is repeated for a total of N×M step results.

Figure 11:
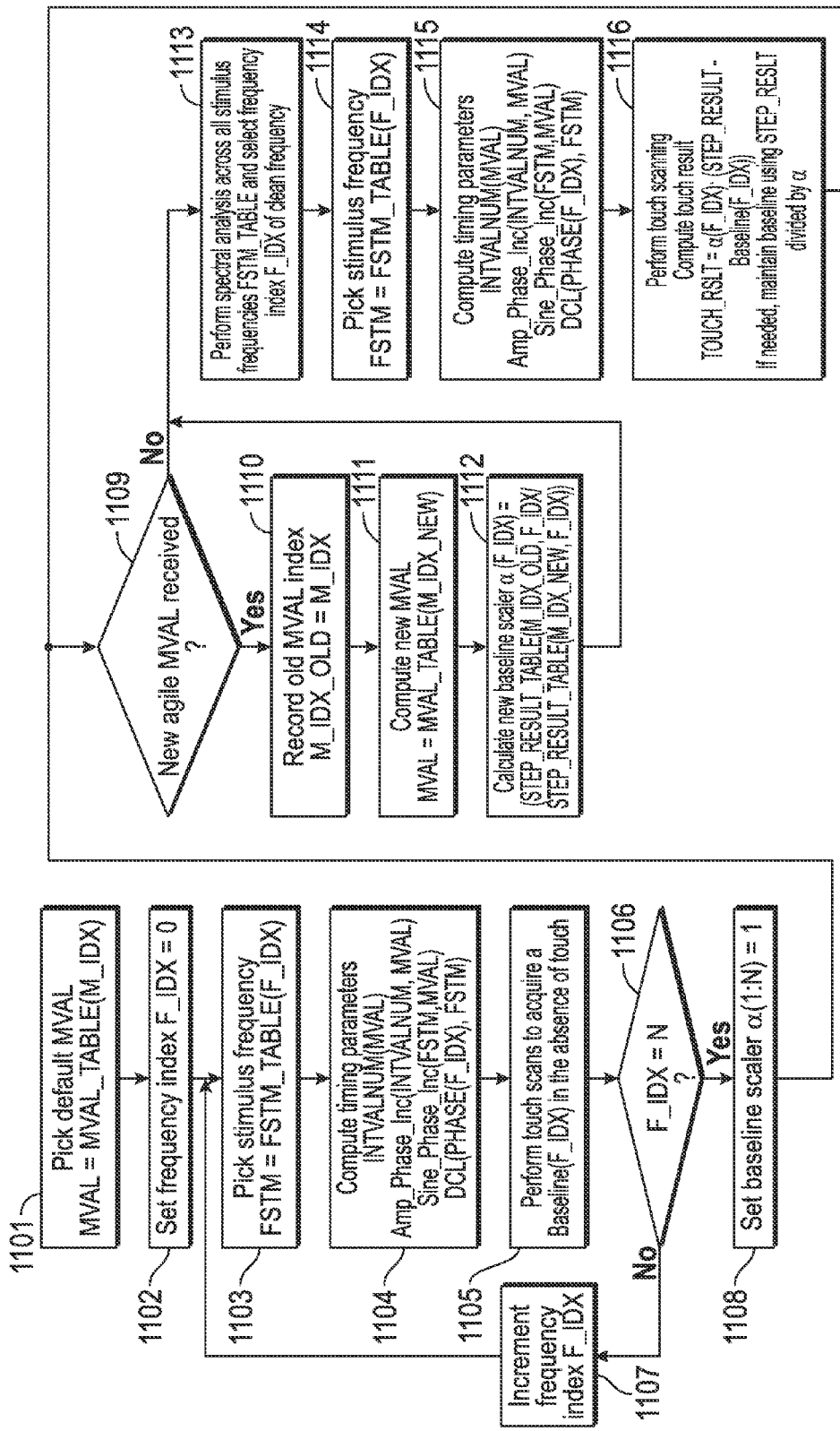
FIG. 11 illustrates an exemplary flow-chart for a frequency agile touch controller according to examples of the disclosure.

FIG. 11 illustrates an exemplary flow-chart for a frequency agile touch controller according to examples of the disclosure. Upon power up, the touch controller can acquire a baseline in steps 1101 to 1106. A baseline can refer to a touch image that is acquired in the absence of touch that can be used to compare against an acquired touch image to determine if a touch input has occurred on a touch sensor panel. In step 1101 the touch controller can pick a default MVAL. The default MVAL can be the same MVAL for which demodulation phase (PHASE) and receive channel gain (GAIN) is calibrated for a given stimulus frequency. In step 1102 and subsequent steps, a baseline can be acquired for the default MVAL. In step 1102 the frequency index is set to 0 and in step 1103 a stimulus frequency is selected from the frequency table FST-M_TABLE based on the current frequency index F_IDX. At step 1104, timing parameters INTVALNUM, Amp_Phase_Inc, Sine_Phase_Inc and DCL can be selected based on the selected stimulus frequency FSTM and MVAL. At step 1105 multiple touch scans are performed to acquire a baseline at the selected stimulus frequency based on frequency index F_IDX. In this example, the baseline is the step result acquired in the absence of a touch condition. At step 1106 the frequency index can compared against N, which represents the maximum number of stimulus frequencies for which to acquire a baseline.

If F_IDX<N then the frequency index can incremented and steps 1103 to 1105 are repeated. The whole process can be repeated until baselines for all touch frequencies have been acquired. Once all baselines are acquired, the touch controller can then check whether a new agile MVAL has been received from the host controller. If no new agile MVAL has been received from the host controller, the touch controller resumes with step 1113 and performs spectral analysis to select a stimulus frequency with the lowest noise level. At step 1114 the stimulus frequency can be selected based on the frequency index F_IDX. At step 1115 timing parameters INTVALNUM, Amp_Phase_Inc, Sine_Phase_Inc and DCL are picked based on the newly selected stimulus frequency. In step 1116 a touch scan is performed for the selected stimulus frequency and MVAL. The reported touch result TOUCH_RSLT can represent the baseline compensated step result scaled by the baseline scaler alpha.

If the touch controller receives a new agile MVAL in step 1109, the touch controller can perform steps 1110 to 1112 to compute a new baseline scaler based on the new MVAL. In step 1110 the MVAL index of the current MVAL can be captured and a new MVAL can be computed based on the new MVAL index. In step 1112 a new baseline scaler can be computed as a function of the selected stimulus frequency. The baseline scaler can be computed as follows:

$$\alpha(F\_IDX) = (STEP\_RESULT\_TABLE(M\_IDX\_OLD, F\_IDX/STEP\_RESULT\_TABLE(M\_IDX\_NEW, F\_IDX)) \quad (25)$$

Figure 12A:
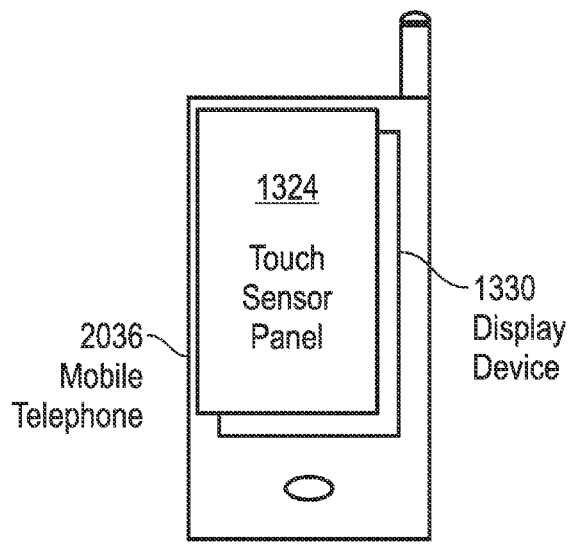
FIG. 12a illustrates an exemplary mobile phone that can include an agile clocking dynamic scaling engine according to examples of the disclosure.

Here STEP_RESULT_TABLE contains the step results derived from the calibration process described in FIG. 10, M_IDX_OLD is the old MVAL index, M_IDX_NEW is the new MVAL index and F_IDX is the frequency index. The baseline scaler can be deterministic as its value can be independent of the frequency response of the panel as the spectral response of the touch subsystem for a given stimulus frequency can be maintained regardless of the HFO clock FCLK_HFO FIG. 12a illustrates example mobile telephone 2036 that can include touch sensor panel 1324 and display device 1330, the touch sensor panel including an agile clocking dynamic scaling engine according to examples of the disclosure.

Figure 12B:
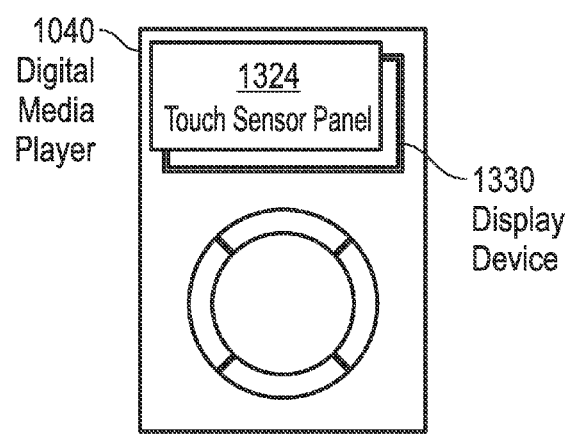
FIG. 12b illustrates an exemplary digital media player that can include an agile clocking dynamic scaling engine according to examples of the disclosure.

FIG. 12b illustrates example digital media player 1040 that can include touch sensor panel 1324 and display device 1330, the touch sensor panel including an agile clocking dynamic scaling engine according to examples of the disclosure.

Figure 12C:
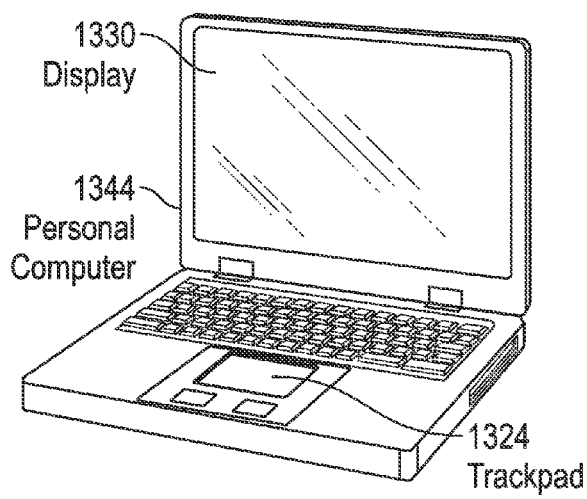
FIG. 12c illustrates an exemplary personal computer that can include an agile clocking dynamic scaling engine according to examples of the disclosure.

FIG. 12c illustrates example personal computer 1344 that can include touch sensor panel (trackpad) 1324 and display 1330, the touch sensor panel and/or display of the personal computer (in examples where the display is part of a touch screen) including an agile clocking dynamic scaling engine according to examples of the disclosure. While not illustrated, a tablet computer can also include an agile clocking dynamic scaling engine according to examples of the disclosure.

Therefore, according to the above, some examples of the disclosure are directed to A touch controller comprising: an oscillator section configured to provide a master clock signal and change a frequency of the master clock signal in response to a command; a plurality of touch sensing sections configured to receive the master clock signal from the oscillator section and perform functions associated with generating stimulation signals and receiving and detecting signals indicative of a touch event, the plurality of touch sensing sections including one or more time dependent parameters and one or more sample domain parameters; and a processor capable of: calculating one or more baseline values associated with the plurality of touch sensing sections; calculating an initial value for each of the one or more time dependent parameters and the one or more sample domain parameters; detecting changes in the frequency of the master clock signal; recalculating the one or more baseline values associated with the plurality of touch sensing sections; recalculating the one or more values of the one or more sample domain parameters in response to the detected change in the master clock frequency such that one or more values of the one or more time dependent parameters remain constant; and performing a touch scan to detect a touch input event based on the one or more recalculated baseline values and the one or more recalculated sample domain parameters. Additionally or alternatively to one or more of the examples disclosed above, in some examples, the touch controller is communicatively coupled to a touch sensor panel, the touch sensor panel configured for receiving the stimulation signals and generating the signals indicative of the touch event. Additionally or alternatively to one or more of the examples disclosed above, in some examples, the plurality of touch sensing sections include one or more oscillators, wherein the one or more oscillators include a phase accumulation parameter in the sample domain and phase and frequency parameters in the time domain, and wherein the agile clocking dynamic scaling engine is configured for changing a value of the phase accumulation parameter in response to a detected change in the master clock frequency such that the phase and frequency parameters of the one or more oscillators remain constant. Additionally or alternatively to one or more of the examples disclosed above, in some examples, the plurality of touch sensing sections include one or more oscillators, wherein the one or more oscillators include an amplitude accumulation parameter in the sample domain and phase and frequency parameters in the time domain, and wherein the agile clocking dynamic scaling engine is configured for changing a value of the amplitude accumulation parameter in response to a detected change in the master clock frequency such that the phase and frequency parameters of the one or more oscillators remain constant. Additionally or alternatively to one or more of the examples disclosed above, in some examples, the plurality of touch sensing sections include a programmable delay unit configured to adjust a phase setting of the touch controller, and wherein the programmable delay unit can include a fine delay tuning parameter and a coarse delay tuning parameter. Additionally or alternatively to one or more of the examples disclosed above, in some examples, the agile clocking dynamic scaling engine is configured for changing a value of the coarse delay tuning parameter in response to a detected change in the master clock frequency such that the phase setting of the touch controller remains approximately constant. Additionally or alternatively to one or more of the examples disclosed above, in some examples, the agile clocking dynamic scaling engine is configured for changing a value of the fine delay tuning parameter in response to a detected change in the master clock frequency such that the phase setting of the touch controller remains approximately constant. Additionally or alternatively to one or more of the examples disclosed above, in some examples, the agile clocking dynamic scaling engine is configured for changing the value of the fine delay tuning parameter based on a detected change in the master clock frequency such that a resolution of the programmable delay is fine enough to minimize errors in a touch image associated with the detected change in the master clock frequency.

Some examples of the disclosure are directed to A method of adjusting a touch controller's parameters in response to a changing master clock frequency, the method comprising: calculating one or more baseline values associated with a plurality of touch sensing sections of the touch controller; calculating and setting an initial value for one or more time dependent parameters and one or more sample domain parameters of the touch sensing sections of the touch controller; detecting changes in the frequency of the master clock signal; recalculating the one or more baseline values associated with the plurality of touch sensing sections; recalculating and setting the one or more values of the one or more sample domain parameters in response to the detected change in the master clock frequency such that one or more values of the one or more time dependent parameters remain constant; and performing a touch scan to detect a touch input event based on the one or more recalculated baseline values and the one or more recalculated sample domain parameters. Additionally or alternatively to one or more of the examples disclosed above, in some examples, the plurality of touch sensing sections include one or more oscillators, wherein the one or more oscillators include a phase accumulation parameter in the sample domain and phase and frequency parameters in the time domain, and wherein recalculating and setting the one or more values of the one or more sample domain parameters in response to the detected change in the master clock frequency such that one or more values of the one or more time dependent parameters remain constant includes recalculating and setting a value of the phase accumulation parameter in response to a detected change in the master clock frequency such that the phase and frequency parameters of the one or more oscillators remain constant. Additionally or alternatively to one or more of the examples disclosed above, in some examples, the plurality of touch sensing sections include one or more oscillators, wherein the one or more oscillators include an amplitude accumulation parameter in the sample domain and phase and frequency parameters in the time domain, and wherein recalculating and setting the one or more values of the one or more sample domain parameters in response to the detected change in the master clock frequency such that one or more values of the one or more time dependent parameters remain constant includes recalculating and setting a value of the amplitude accumulation parameter in response to a detected change in the master clock frequency such that the phase and frequency parameters of the one or more oscillators remain constant. Additionally or alternatively to one or more of the examples disclosed above, in some examples, the plurality of touch sensing sections include one or more accumulators, wherein the one or more accumulators include a number of samples per measurement parameter in the sample domain and a integration time parameter in the time domain, and wherein recalculating and setting the one or more values of the one or more sample domain parameters in response to the detected change in the master clock frequency such that one or more values of the one or more time dependent parameters remain constant includes recalculating and setting a value of the number of samples per measurement parameter in response to a detected change in the master clock frequency such that the integration time parameter of the one or more accumulators remain constant. Additionally or alternatively to one or more of the examples disclosed above, in some examples, the plurality of touch sensing sections include a programmable delay unit configured to adjust a phase setting of the touch controller, and wherein the programmable delay unit can include a fine delay tuning parameter and a coarse delay tuning parameter. Additionally or alternatively to one or more of the examples disclosed above, in some examples, recalculating and setting the one or more values of the one or more sample domain parameters in response to the detected change in the master clock frequency such that one or more values of the one or more time dependent parameters remain constant includes recalculating and setting a value of the coarse delay tuning parameter in response to a detected change in the master clock frequency such that the phase setting of the touch controller remains approximately constant. Additionally or alternatively to one or more of the examples disclosed above, in some examples, recalculating and setting the one or more values of the one or more sample domain parameters in response to the detected change in the master clock frequency such that one or more values of the one or more time dependent parameters remain constant includes recalculating and setting a value of the fine delay tuning parameter in response to a detected change in the master clock frequency such that the phase setting of the touch controller remains approximately constant. Additionally or alternatively to one or more of the examples disclosed above, in some examples, the method further includes changing the value of the fine delay tuning parameter based on a detected change in the master clock frequency such that a resolution of the programmable delay is fine enough to minimize errors in a touch image associated with the detected change in the master clock frequency.

Some examples of the disclosure are directed to a non-transitory computer readable storage medium having stored thereon a set of instructions for synchronizing a touch data acquisition process, a stylus data acquisition process and a display refresh process, that when executed by a processor causes the processor to: calculate one or more baseline values associated with a plurality of touch sensing sections of the touch controller; calculate an initial value for one or more time dependent parameters and one or more sample domain parameters of the touch sensing sections of the touch controller; detect changes in the frequency of the master clock signal; recalculate the one or more baseline values associated with the plurality of touch sensing sections; recalculate the one or more values of the one or more sample domain parameters in response to the detected change in the master clock frequency such that one or more values of the one or more time dependent parameters remain constant; and perform a touch scan to detect a touch input event based on the one or more recalculated baseline values and the one or more recalculated sample domain parameters. Additionally or alternatively to one or more of the examples disclosed above, in some examples, the plurality of touch sensing sections include one or more oscillators, wherein the one or more oscillators include a phase accumulation parameter in the sample domain and phase and frequency parameters in the time domain, and wherein recalculating and setting the one or more values of the one or more sample domain parameters in response to the detected change in the master clock frequency such that one or more values of the one or more time dependent parameters remain constant includes recalculating and setting a value of the phase accumulation parameter in response to a detected change in the master clock frequency such that the phase and frequency parameters of the one or more oscillators remain constant. Additionally or alternatively to one or more of the examples disclosed above, in some examples, the plurality of touch sensing sections include one or more oscillators, wherein the one or more oscillators include an amplitude accumulation parameter in the sample domain and phase and frequency parameters in the time domain, and wherein recalculating and setting the one or more values of the one or more sample domain parameters in response to the detected change in the master clock frequency such that one or more values of the one or more time dependent parameters remain constant includes recalculating and setting a value of the amplitude accumulation parameter in response to a detected change in the master clock frequency such that the phase and frequency parameters of the one or more oscillators remain constant. Additionally or alternatively to one or more of the examples disclosed above, in some examples, the plurality of touch sensing sections include one or more accumulators, wherein the one or more accumulators include a number of samples per measurement parameter in the sample domain and a integration time parameter in the time domain, and wherein recalculating and setting the one or more values of the one or more sample domain parameters in response to the detected change in the master clock frequency such that one or more values of the one or more time dependent parameters remain constant includes recalculating and setting a value of the number of samples per measurement parameter in response to a detected change in the master clock frequency such that the integration time parameter of the one or more accumulators remain constant. Additionally or alternatively to one or more of the examples disclosed above, in some examples, the plurality of touch sensing sections include a programmable delay unit configured to adjust a phase setting of the touch controller, and wherein the programmable delay unit can include a fine delay tuning parameter and a coarse delay tuning parameter. Additionally or alternatively to one or more of the examples disclosed above, in some examples, recalculating and setting the one or more values of the one or more sample domain parameters in response to the detected change in the master clock frequency such that one or more values of the one or more time dependent parameters remain constant includes recalculating and setting a value of the coarse delay tuning parameter in response to a detected change in the master clock frequency such that the phase setting of the touch controller remains approximately constant. Additionally or alternatively to one or more of the examples disclosed above, in some examples, recalculating and setting the one or more values of the one or more sample domain parameters in response to the detected change in the master clock frequency such that one or more values of the one or more time dependent parameters remain constant includes recalculating and setting a value of the fine delay tuning parameter in response to a detected change in the master clock frequency such that the phase setting of the touch controller remains approximately constant. Additionally or alternatively to one or more of the examples disclosed above, in some examples, the processor is further caused to change the value of the fine delay tuning parameter based on a detected change in the master clock frequency such that a resolution of the programmable delay is fine enough to minimize errors in a touch image associated with the detected change in the master clock frequency.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A touch controller comprising:
   an oscillator section configured to provide a master clock signal and change a frequency of the master clock signal in response to a command;
   a plurality of touch sensing sections configured to receive the master clock signal from the oscillator section and perform functions associated with generating stimulation signals and receiving and detecting signals indicative of a touch event, the plurality of touch sensing sections including one or more time dependent parameters and one or more sample domain parameters; and
   a processor capable of:
      calculating one or more baseline values associated with the plurality of touch sensing sections;
      calculating an initial value for each of the one or more time dependent parameters and the one or more sample domain parameters;
      detecting changes in the frequency of the master clock signal;
      recalculating the one or more baseline values associated with the plurality of touch sensing sections;
      recalculating the one or more values of the one or more sample domain parameters in response to the detected change in the master clock frequency such that one or more values of the one or more time dependent parameters remain constant; and
      performing a touch scan to detect a touch input event based on the one or more recalculated baseline values and the one or more recalculated sample domain parameters.

2. The touch controller of claim 1, wherein the touch controller is communicatively coupled to a touch sensor panel, the touch sensor panel configured for receiving the stimulation signals and generating the signals indicative of the touch event.

3. The touch controller of claim 1, wherein the plurality of touch sensing sections include one or more oscillators, wherein the one or more oscillators include a phase accumulation parameter in the sample domain and phase and frequency parameters in the time domain, and wherein an agile clocking dynamic scaling engine is configured for changing a value of the phase accumulation parameter in response to a detected change in the master clock frequency such that the phase and frequency parameters of the one or more oscillators remain constant.

4. The touch controller of claim 1, wherein the plurality of touch sensing sections include one or more oscillators, wherein the one or more oscillators include an amplitude accumulation parameter in the sample domain and phase and frequency parameters in the time domain, and wherein an agile clocking dynamic scaling engine is configured for changing a value of the amplitude accumulation parameter in response to a detected change in the master clock frequency such that the phase and frequency parameters of the one or more oscillators remain constant.

5. The touch controller of claim 1, wherein the plurality of touch sensing sections include one or more accumulators, wherein the one or more accumulators include a number of samples per measurement parameter in the sample domain and a integration time parameter in the time domain, and wherein an agile clocking dynamic scaling engine is configured for changing a value of the number of samples per measurement parameter in response to a detected change in the master clock frequency such that the integration time parameter of the one or more accumulators remain constant.

6. The touch controller of claim 1, wherein the plurality of touch sensing sections include a programmable delay unit configured to adjust a phase setting of the touch controller, and wherein the programmable delay unit can include a fine delay tuning parameter and a coarse delay tuning parameter.

7. The touch controller of claim 6, wherein an agile clocking dynamic scaling engine is configured for changing a value of the coarse delay tuning parameter in response to a detected change in the master clock frequency such that the phase setting of the touch controller remains approximately constant.

8. The touch controller of claim 6, wherein an agile clocking dynamic scaling engine is configured for changing a value of the fine delay tuning parameter in response to a detected change in the master clock frequency such that the phase setting of the touch controller remains approximately constant.

9. The touch controller of claim 6, wherein an agile clocking dynamic scaling engine is configured for changing the value of the fine delay tuning parameter based on a detected change in the master clock frequency such that a resolution of the programmable delay is fine enough to minimize errors in a touch image associated with the detected change in the master clock frequency.

10. A method of adjusting a touch controller's parameters in response to a changing master clock frequency, the method comprising:
calculating one or more baseline values associated with a plurality of touch sensing sections of the touch controller;
calculating and setting an initial value for one or more time dependent parameters and one or more sample domain parameters of the touch sensing sections of the touch controller;
detecting changes in the frequency of the master clock signal;
recalculating the one or more baseline values associated with the plurality of touch sensing sections;
recalculating and setting the one or more values of the one or more sample domain parameters in response to the detected change in the master clock frequency such that one or more values of the one or more time dependent parameters remain constant; and
performing a touch scan to detect a touch input event based on the one or more recalculated baseline values and the one or more recalculated sample domain parameters.

11. The method of claim 9, wherein the plurality of touch sensing sections include one or more oscillators, wherein the one or more oscillators include a phase accumulation parameter in the sample domain and phase and frequency parameters in the time domain, and wherein recalculating and setting the one or more values of the one or more sample domain parameters in response to the detected change in the master clock frequency such that one or more values of the one or more time dependent parameters remain constant includes recalculating and setting a value of the phase accumulation parameter in response to a detected change in the master clock frequency such that the phase and frequency parameters of the one or more oscillators remain constant.

12. The method of claim 10, wherein the plurality of touch sensing sections include one or more oscillators, wherein the one or more oscillators include an amplitude accumulation parameter in the sample domain and phase and frequency parameters in the time domain, and wherein recalculating and setting the one or more values of the one or more sample domain parameters in response to the detected change in the master clock frequency such that one or more values of the one or more time dependent parameters remain constant includes recalculating and setting a value of the amplitude accumulation parameter in response to a detected change in the master clock frequency such that the phase and frequency parameters of the one or more oscillators remain constant.

13. The method of claim 10, wherein the plurality of touch sensing sections include one or more accumulators, wherein the one or more accumulators include a number of samples per measurement parameter in the sample domain and a integration time parameter in the time domain, and wherein recalculating and setting the one or more values of the one or more sample domain parameters in response to the detected change in the master clock frequency such that one or more values of the one or more time dependent parameters remain constant includes recalculating and setting a value of the number of samples per measurement parameter in response to a detected change in the master clock frequency such that the integration time parameter of the one or more accumulators remain constant.

14. The method of claim 10, wherein the plurality of touch sensing sections include a programmable delay unit configured to adjust a phase setting of the touch controller, and wherein the programmable delay unit can include a fine delay tuning parameter and a coarse delay tuning parameter.

15. The method of claim 14, wherein recalculating and setting the one or more values of the one or more sample domain parameters in response to the detected change in the master clock frequency such that one or more values of the one or more time dependent parameters remain constant includes recalculating and setting a value of the coarse delay tuning parameter in response to a detected change in the master clock frequency such that the phase setting of the touch controller remains approximately constant.

16. The method of claim 14, wherein recalculating and setting the one or more values of the one or more sample domain parameters in response to the detected change in the master clock frequency such that one or more values of the one or more time dependent parameters remain constant includes recalculating and setting a value of the fine delay tuning parameter in response to a detected change in the master clock frequency such that the phase setting of the touch controller remains approximately constant.

17. The method of claim 16, the method further including changing the value of the fine delay tuning parameter based on a detected change in the master clock frequency such that a resolution of the programmable delay is fine enough to minimize errors in a touch image associated with the detected change in the master clock frequency.

18. A non-transitory computer readable storage medium having stored thereon a set of instructions for synchronizing a touch data acquisition process, a stylus data acquisition process and a display refresh process, that when executed by a processor causes the processor to:
calculate one or more baseline values associated with a plurality of touch sensing sections of the touch controller;

calculate an initial value for one or more time dependent parameters and one or more sample domain parameters of the touch sensing sections of the touch controller;

detect changes in the frequency of the master clock signal;

recalculate the one or more baseline values associated with the plurality of touch sensing sections;

recalculate the one or more values of the one or more sample domain parameters in response to the detected change in the master clock frequency such that one or more values of the one or more time dependent parameters remain constant; and perform a touch scan to detect a touch input event based on the one or more recalculated baseline values and the one or more recalculated sample domain parameters.

19. The non-transitory computer readable storage medium of claim 18, wherein the plurality of touch sensing sections include one or more oscillators, wherein the one or more oscillators include a phase accumulation parameter in the sample domain and phase and frequency parameters in the time domain, and wherein recalculating and setting the one or more values of the one or more sample domain parameters in response to the detected change in the master clock frequency such that one or more values of the one or more time dependent parameters remain constant includes recalculating and setting a value of the phase accumulation parameter in response to a detected change in the master clock frequency such that the phase and frequency parameters of the one or more oscillators remain constant.

20. The non-transitory computer readable storage medium of claim 18, wherein the plurality of touch sensing sections include one or more oscillators, wherein the one or more oscillators include an amplitude accumulation parameter in the sample domain and phase and frequency parameters in the time domain, and wherein recalculating and setting the one or more values of the one or more sample domain parameters in response to the detected change in the master clock frequency such that one or more values of the one or more time dependent parameters remain constant includes recalculating and setting a value of the amplitude accumulation parameter in response to a detected change in the master clock frequency such that the phase and frequency parameters of the one or more oscillators remain constant.

21. The non-transitory computer readable storage medium of claim 18, wherein the plurality of touch sensing sections include one or more accumulators, wherein the one or more accumulators include a number of samples per measurement parameter in the sample domain and a integration time parameter in the time domain, and wherein recalculating and setting the one or more values of the one or more sample domain parameters in response to the detected change in the master clock frequency such that one or more values of the one or more time dependent parameters remain constant includes recalculating and setting a value of the number of samples per measurement parameter in response to a detected change in the master clock frequency such that the integration time parameter of the one or more accumulators remain constant.

22. The non-transitory computer readable storage medium of claim 18, wherein the plurality of touch sensing sections include a programmable delay unit configured to adjust a phase setting of the touch controller, and wherein the programmable delay unit can include a fine delay tuning parameter and a coarse delay tuning parameter.

23. The non-transitory computer readable storage medium of claim 22, wherein recalculating and setting the one or more values of the one or more sample domain parameters in response to the detected change in the master clock frequency such that one or more values of the one or more time dependent parameters remain constant includes recalculating and setting a value of the coarse delay tuning parameter in response to a detected change in the master clock frequency such that the phase setting of the touch controller remains approximately constant.

24. The non-transitory computer readable storage medium of claim 22, wherein recalculating and setting the one or more values of the one or more sample domain parameters in response to the detected change in the master clock frequency such that one or more values of the one or more time dependent parameters remain constant includes recalculating and setting a value of the fine delay tuning parameter in response to a detected change in the master clock frequency such that the phase setting of the touch controller remains approximately constant.

25. The non-transitory computer readable storage medium of claim 24, the processor being further caused to change the value of the fine delay tuning parameter based on a detected change in the master clock frequency such that a resolution of the programmable delay is fine enough to minimize errors in a touch image associated with the detected change in the master clock frequency.

\* \* \* \* \*